(12) United States Patent
LaPray et al.

(10) Patent No.: US 11,674,018 B2
(45) Date of Patent: Jun. 13, 2023

(54) POLYMER AND CARBOHYDRATE-BASED POLYMERIC MATERIAL BLENDS WITH PARTICULAR PARTICLE SIZE CHARACTERISTICS

(71) Applicant: BiologiQ, Inc., Idaho Falls, ID (US)

(72) Inventors: Bradford LaPray, Idaho Falls, ID (US); Donald R. Allen, Idaho Falls, ID (US); Wenji Quan, Idaho Falls, ID (US); Bruno R. Pereira, Houston, TX (US); Shigenobu Miura, Tokyo (JP)

(73) Assignee: BIOLOGIQ, INC., Idaho Falls, ID (US)

( * ) Notice: Subject to any disclaimer, the term of this patent is extended or adjusted under 35 U.S.C. 154(b) by 0 days.

(21) Appl. No.: 16/925,705

(22) Filed: Jul. 10, 2020

(65) Prior Publication Data
US 2020/0339784 A1 Oct. 29, 2020

Related U.S. Application Data

(63) Continuation-in-part of application No. 15/691,588, filed on Aug. 30, 2017, which is a (Continued)

(51) Int. Cl.
*C08L 3/02* (2006.01)
*C05G 5/35* (2020.01)
(Continued)

(52) U.S. Cl.
CPC .................. *C08L 3/02* (2013.01); *C05G 5/35* (2020.02); *C08K 5/0016* (2013.01); *C09D 103/02* (2013.01)

(58) Field of Classification Search
CPC ........... C08L 3/02; C05G 5/35; C08K 5/0016; C09D 103/02
See application file for complete search history.

(56) References Cited

U.S. PATENT DOCUMENTS 3,270,874 A 9/1966 Hilton
3,865,603 A 2/1975 Szymanski et al.
(Continued)

FOREIGN PATENT DOCUMENTS

BR PI0715273 A2 6/2013
BR PI0715276 A2 6/2013
(Continued)

OTHER PUBLICATIONS

Ibbrucker, Constance "Oxo-degradable plastics increasingly underfire in Europe" European Bioplastics, http://www.european-bioplastics.org/oxo-degradable-plastics-increasingly-under-fire-in-europe/ Feb. 28, 2017, 5 pages.
(Continued)

*Primary Examiner* — Arrie L Reuther
(74) *Attorney, Agent, or Firm* — Workman Nydegger

(57) ABSTRACT

Described herein are blends of carbohydrate-based polymeric materials with other polymeric materials, where the carbohydrate-based polymeric material is intimately blended with the other polymeric material, so as to exhibit very small particles sizes (e.g., less than 2 μm, or less than 1 μm) for the carbohydrate-based polymeric material in the matrix of the other polymeric material. Such intimate dispersion of very small particles provides for far more of the particles dispersed more evenly throughout the matrix of the other polymeric material, which may enhance various performance characteristics of the blended composite material, and provide for more consistent achievement of such characteristics, from batch to batch. Methods of producing articles from such blends exhibiting such small particles and excellent dispersion are also disclosed. While suitable for use in a wide variety of fields, examples may include for the coating of paper cups, and as a capsule material for sustained release fertilizer.

37 Claims, 8 Drawing Sheets

Related U.S. Application Data continuation-in-part of application No. 14/853,725, filed on Sep. 14, 2015, now abandoned, said application No. 15/691,588 is a continuation-in-part of application No. 14/853,780, filed on Sep. 14, 2015, now abandoned, and a continuation-in-part of application No. 15/481,806, filed on Apr. 7, 2017, and a continuation-in-part of application No. 15/481,823, filed on Apr. 7, 2017.

(60) Provisional application No. 62/872,582, filed on Jul. 10, 2019, provisional application No. 62/939,460, filed on Nov. 22, 2019, provisional application No. 62/962,706, filed on Jan. 17, 2020, provisional application No. 62/187,231, filed on Jun. 30, 2015, provisional application No. 62/440,399, filed on Dec. 29, 2016, provisional application No. 62/442,432, filed on Jan. 4, 2017.

(51) Int. Cl.
 C09D 103/02 (2006.01)
 C08K 5/00 (2006.01)

(56) References Cited

U.S. PATENT DOCUMENTS

| | | |
|---|---|---|
| 4,016,117 A | 4/1977 | Griffin |
| 4,139,699 A | 2/1979 | Hernandez |
| 4,243,480 A | 1/1981 | Hernandez |
| 4,853,168 A | 8/1989 | Eden et al. |
| 5,026,745 A | 6/1991 | Weil |
| 5,095,054 A | 3/1992 | Lay et al. |
| 5,262,458 A * | 11/1993 | Bastioli .............. C08L 3/02 524/52 |
| 5,314,934 A | 5/1994 | Tomka |
| 5,362,777 A | 11/1994 | Tomka |
| 5,449,708 A | 9/1995 | Schiltz |
| 5,459,258 A | 10/1995 | Merrill et al. |
| 5,461,093 A | 10/1995 | Yoo et al. |
| 5,462,983 A | 10/1995 | Bloembergen et al. |
| 5,510,401 A | 4/1996 | Dehennau et al. |
| 5,714,445 A | 2/1998 | Trinh et al. |
| 5,810,961 A | 9/1998 | Andersen et al. |
| 6,211,325 B1 | 4/2001 | Sun et al. |
| 6,472,497 B2 | 10/2002 | Loercks et al. |
| 6,605,657 B1 | 8/2003 | Favis et al. |
| 6,709,526 B1 | 3/2004 | Bailey et al. |
| 6,783,854 B2 | 8/2004 | Bond |
| 6,818,295 B2 | 11/2004 | Bond et al. |
| 6,841,597 B2 | 1/2005 | Bastioli et al. |
| 6,844,380 B2 | 1/2005 | Favis et al. |
| 6,946,506 B2 | 9/2005 | Bond et al. |
| 7,608,649 B2 | 10/2009 | Sun et al. |
| 7,666,261 B2 | 2/2010 | Bailey et al. |
| 7,740,952 B2 | 6/2010 | Hausmann et al. |
| 7,998,888 B2 | 8/2011 | Shi et al. |
| 8,188,185 B2 | 5/2012 | Wang et al. |
| 8,232,348 B2 | 7/2012 | Changping |
| 8,283,006 B2 | 10/2012 | Wang et al. |
| 8,329,501 B1 | 12/2012 | Robinson et al. |
| 8,329,601 B2 | 12/2012 | Shi et al. |
| 8,466,337 B2 | 6/2013 | Wang et al. |
| 8,470,222 B2 | 6/2013 | Shi et al. |
| 8,802,754 B2 | 8/2014 | Nie et al. |
| 8,807,254 B2 | 8/2014 | Manus |
| 8,889,945 B2 | 11/2014 | Wang et al. |
| 8,927,611 B2 | 1/2015 | Voolapalli et al. |
| 8,927,617 B2 | 1/2015 | Funk et al. |
| 8,969,224 B2 | 3/2015 | Masuda et al. |
| 9,023,918 B1 | 5/2015 | Mistry et al. |
| 9,056,968 B2 | 6/2015 | Matsuo |
| 9,273,207 B2 | 3/2016 | Bastioli |
| 9,327,438 B2 | 5/2016 | Wang et al. |
| 9,464,188 B2 | 10/2016 | Wang et al. |
| 9,884,471 B2 | 2/2018 | Neuman et al. |
| 9,925,706 B2 | 3/2018 | Bond et al. |
| 10,131,783 B2 | 11/2018 | Schmidt et al. |
| 10,214,634 B2 | 2/2019 | Lapray et al. |
| 10,239,292 B2 | 3/2019 | Nissenbaum et al. |
| 10,494,521 B2 | 12/2019 | Lu et al. |
| 10,752,759 B2 | 8/2020 | Lapray et al. |
| 10,906,209 B2 | 2/2021 | Kann |
| 10,919,203 B2 | 2/2021 | Lapray et al. |
| 10,920,044 B2 | 2/2021 | Lapray et al. |
| 11,111,355 B2 | 9/2021 | Lapray et al. |
| 11,111,363 B2 | 9/2021 | Lapray et al. |
| 11,149,144 B2 | 10/2021 | Lapray et al. |
| 11,359,088 B2 | 6/2022 | Allen et al. |
| 2002/0006989 A1 | 1/2002 | Bastioli et al. |
| 2002/0168517 A1 | 11/2002 | Husemann et al. |
| 2002/0168518 A1 | 11/2002 | Bond et al. |
| 2002/0188041 A1 | 12/2002 | Bond et al. |
| 2003/0077444 A1 | 4/2003 | Bond et al. |
| 2003/0119949 A1 | 6/2003 | Favis et al. |
| 2003/0166779 A1 | 9/2003 | Khemani |
| 2003/0203196 A1 | 10/2003 | Trokhan et al. |
| 2007/0129468 A1 | 6/2007 | Bastioli et al. |
| 2008/0103232 A1 | 5/2008 | Lake et al. |
| 2008/0287592 A1 | 11/2008 | Favis et al. |
| 2009/0042468 A1 | 2/2009 | Suzuki et al. |
| 2009/0048368 A1 | 2/2009 | Bash et al. |
| 2010/0115836 A1 | 5/2010 | Julian |
| 2010/0159777 A1 | 6/2010 | Wang et al. |
| 2010/0311874 A1 | 12/2010 | Mentink et al. |
| 2010/0311905 A1 | 12/2010 | Mentink et al. |
| 2011/0287929 A1 | 11/2011 | Smith et al. |
| 2012/0048769 A1 | 3/2012 | Sivik et al. |
| 2012/0059097 A1 | 3/2012 | Liao et al. |
| 2012/0139154 A1 | 6/2012 | Huneault et al. |
| 2012/0220697 A2 | 8/2012 | Deaner et al. |
| 2012/0283364 A1 | 11/2012 | Sarazin et al. |
| 2012/0316257 A1 | 12/2012 | Bastioli |
| 2013/0001289 A1 | 1/2013 | Tedford |
| 2013/0052901 A1 | 2/2013 | Bond et al. |
| 2013/0157031 A1 | 6/2013 | Wang et al. |
| 2013/0157032 A1 | 6/2013 | Wang et al. |
| 2014/0011921 A1 | 1/2014 | Bash et al. |
| 2014/0079935 A1 | 3/2014 | Broyles |
| 2014/0087980 A1 | 3/2014 | Mitrovich et al. |
| 2014/0272370 A1 | 9/2014 | Broyles et al. |
| 2015/0045454 A1 | 2/2015 | Kong et al. |
| 2015/0166746 A1 | 6/2015 | Brule et al. |
| 2016/0107426 A1 | 4/2016 | Leufgens |
| 2017/0002184 A1 | 1/2017 | Lapray et al. |
| 2017/0002185 A1 | 1/2017 | Lapray et al. |
| 2017/0210889 A1 | 7/2017 | Lapray et al. |
| 2017/0218184 A1 | 8/2017 | Lapray et al. |
| 2017/0283597 A1 | 10/2017 | Lapray et al. |
| 2017/0355179 A1 | 12/2017 | Sehanobish et al. |
| 2017/0362418 A1 | 12/2017 | Lapray et al. |
| 2018/0100060 A1 | 4/2018 | Lapray et al. |
| 2019/0194426 A1 | 6/2019 | Lapray et al. |
| 2019/0256681 A1 | 8/2019 | Lapray et al. |
| 2019/0276664 A1 | 9/2019 | Lapray et al. |
| 2019/0315942 A1 | 10/2019 | Lapray et al. |
| 2019/0315947 A1 | 10/2019 | Lapray et al. |
| 2019/0330770 A1 | 10/2019 | Shi et al. |
| 2020/0339781 A1 | 10/2020 | Lapray et al. |
| 2020/0339803 A1 | 10/2020 | Allen et al. |
| 2020/0377705 A1 | 12/2020 | LaPray et al. |
| 2021/0269944 A1 | 9/2021 | Allen et al. |
| 2021/0277207 A1 | 9/2021 | Allen et al. |
| 2021/0277556 A1 | 9/2021 | Allen et al. |
| 2021/0324186 A1 | 10/2021 | LaPray et al. |
| 2021/0363335 A1 | 11/2021 | LaPray et al. |
| 2022/0227949 A1 | 7/2022 | Allen et al. |

FOREIGN PATENT DOCUMENTS

| | | |
|---|---|---|
| BR | PI0817531 B1 | 8/2019 |
| BR | 112013002928 B1 | 6/2020 |
| BR | 112020012930 A2 | 12/2020 |

(56) References Cited

FOREIGN PATENT DOCUMENTS

| | | |
|---|---|---|
| BR | 102020022378 A2 | 5/2022 |
| CA | 1031088 A | 5/1978 |
| CA | 2827702 A1 | 3/2014 |
| CN | 1312838 A | 9/2001 |
| CN | 1603361 A | 4/2005 |
| CN | 101171292 A | 4/2008 |
| CN | 101589097 A | 11/2009 |
| CN | 101805499 A | 8/2010 |
| CN | 101932647 A | 12/2010 |
| CN | 102066467 A | 5/2011 |
| CN | 102153786 A | 8/2011 |
| CN | 102329436 A | 1/2012 |
| CN | 102639594 A | 8/2012 |
| CN | 102850626 A | 1/2013 |
| CN | 103087482 A | 5/2013 |
| CN | 103289165 A | 9/2013 |
| CN | 103627153 A | 3/2014 |
| CN | 103819794 A | 5/2014 |
| CN | 103987504 A | 8/2014 |
| CN | 103998195 A | 8/2014 |
| CN | 105531115 A | 4/2016 |
| CN | 105670239 A | 6/2016 |
| CN | 105966014 A | 9/2016 |
| CN | 107793619 A | 3/2018 |
| CN | 108276744 A | 7/2018 |
| EP | 0326517 A1 | 8/1989 |
| EP | 0497706 A1 | 8/1992 |
| EP | 1930487 A1 | 6/2008 |
| EP | 2762307 A1 | 8/2014 |
| GB | 2272699 A | 5/1994 |
| JP | 49-055740 A | 5/1974 |
| JP | 50-086543 A | 7/1975 |
| JP | 04-202567 A | 7/1992 |
| JP | 07-126449 A | 5/1995 |
| JP | 07-258488 A | 10/1995 |
| JP | 09-041224 A | 2/1997 |
| JP | 10-259083 A | 9/1998 |
| JP | 11-322962 A | 11/1999 |
| JP | 2003-073539 A | 3/2003 |
| JP | 2003-518541 A | 6/2003 |
| JP | 2004-002613 A | 1/2004 |
| JP | 2004-202567 | 7/2004 |
| JP | 3539955 B2 | 7/2004 |
| JP | 2005-089718 A | 4/2005 |
| JP | 2005-264111 A | 9/2005 |
| JP | 2008-013602 A | 1/2008 |
| JP | 4202567 | 12/2008 |
| JP | 2009-185305 A | 8/2009 |
| JP | 2010-150305 A | 7/2010 |
| JP | 2010-260923 A | 11/2010 |
| JP | 2011-042032 A | 3/2011 |
| JP | 2011-511120 A | 4/2011 |
| JP | 2011-511121 A | 4/2011 |
| JP | 2011-213836 A | 10/2011 |
| JP | 2012-148507 A | 8/2012 |
| JP | 2013-509495 A | 3/2013 |
| JP | 2013-147609 A | 8/2013 |
| JP | 5544303 B2 | 7/2014 |
| JP | 2014-518956 A | 8/2014 |
| JP | 2018-502744 A | 2/2018 |
| JP | 2018-525467 A | 9/2018 |
| JP | 6949736 B2 | 10/2021 |
| TW | 201538529 A | 10/2015 |
| WO | 01/48078 A1 | 7/2001 |
| WO | 03/14164 A1 | 2/2003 |
| WO | 2006/116861 A1 | 11/2006 |
| WO | 2007/027163 A2 | 3/2007 |
| WO | 2009/073197 A1 | 6/2009 |
| WO | 2009/103052 A1 | 8/2009 |
| WO | 2011/020170 A1 | 2/2011 |
| WO | 2012/088585 A1 | 7/2012 |
| WO | 2013/116945 A1 | 8/2013 |
| WO | 2014/089321 A1 | 6/2014 |
| WO | 2014/190395 A1 | 12/2014 |
| WO | 2014/190935 A1 | 12/2014 |
| WO | 2015/028943 A1 | 3/2015 |
| WO | 2016/109196 A1 | 7/2016 |
| WO | 2016/134994 A1 | 9/2016 |
| WO | 2016/198652 A1 | 12/2016 |
| WO | 2018/125897 A1 | 7/2018 |
| WO | 2018/187784 A1 | 10/2018 |
| WO | 2019/043134 A1 | 3/2019 |
| WO | 2019/108056 A1 | 6/2019 |
| WO | 2020/106654 A1 | 5/2020 |

OTHER PUBLICATIONS

IDS Statement filed Aug. 21, 2020 in U.S. Appl. No. 16/999,542.
International Search Report issued in PCT Application PCT/US2019/28733, dated Mar. 9, 2019.
Jie Ren "Preparation, characterization and properties of binary and ternary blends with thermoplastic starch, poly (lactic acid) and poly(butylene adipate-co-terephthalate)," Elsevier, Carbohydrate Polymers, 2008, pp. 576-582.
Kalambur, et al. "An Overview of Starch-Based Plastic Blends From Reactive Extrusion" Journal of Plastic Film and Sheeting, 2006, vol. 22, pp. 39-58.
Li, Gang, et al., "Biodegradation of Thermoplastic Starch and its Blends with Poly(lactic acid) and Polyethylene: Influence of Morphology" published in Macromolecular Journals of Chemistry and Physics, 2011 pp. 1147-1154.
Luo, Ying, et al. "Accelerating the degradation of polyethylene composite mulches." Plastics Research Online, May 19, 2017. Society of Plastics Engineers (SPE), DOI: 10.2417/spepro.006909. Accessed Apr. 20, 2018.
Marianne Shirai "Thermoplastic starch/polyester films: Effects of extrusion process and poly (lactic acid) addition," Elsevier, Materials Science and Engineering, 2013, pp. 4112-4117.
Meereboer et al., "Review of recent advances in the biodegradability of polyhydroxyalkanoate (PHA) bioplastics and their composites," Green Chem., vol. 22, 2020, pp. 5519-5558.
Ming et al., CN107793619 Machine Translation, Mar. 13, 2018 (Year: 2018).
Nayak, "Biodegradable PBAT/Starch Nanocomposites", Nov. 24, 2010, Polymer-Plastics Technology and Engineering, 49:14, pp. 1406-1418, accessed on Feb. 24, 2013.
Nguyen et al., "Biodegradability of polymer film based on low density polyethylene and cassava starch," International Biodeterioration & Biodegradation, vol. 115, 2016, pp. 257-265.
Non-Final Office Action received for U.S. Appl. No. 15/691,588, dated Sep. 24, 2020, 10 pages.
Notice of Allowance received for U.S. Appl. No. 15/628,379, dated Oct. 3, 2018.
Notice of Allowance received for U.S. Appl. No. 16/456,303, dated Jul. 1, 2020.
Notice of Allowance received for U.S. Appl. No. 16/456,303, dated Jul. 28, 2020.
Office action for U.S. Appl. No. 14/853,725, dated Apr. 28, 2017, LaPray et al., "Articles Formed with Biodegradable Materials and Strength Characteristics of Same", 13 pages.
Office action for U.S. Appl. No. 14/853,725, dated Apr. 30, 2018, LaPray et al., "Articles Formed with Biodegradable Materials and Strength Characteristics of Same", 19 pages.
Office Action for U.S. Appl. No. 14/853,725, dated Oct. 12, 2018, LaPray et al., "Articles Formed with Biodegradable Materials and Strength Characteristics of Same", 13 pages.
Office Action received for U.S. Appl. No. 15/481,806, dated Apr. 30, 2018.
Office Action received for U.S. Appl. No. 15/481,823, dated Apr. 30, 2018.
Office Action received for U.S. Appl. No. 15/691,588, dated Apr. 30, 2018.
Office Action received for U.S. Appl. No. 15/836,555, dated Aug. 12, 2019.
Office Action received for U.S. Appl. No. 15/691,588, dated May 10, 2019.
Office Action received for U.S. Appl. No. 14/853,780, dated Aug. 10, 2018.

(56) References Cited

OTHER PUBLICATIONS

Office Action received for U.S. Appl. No. 14/853,780, dated Feb. 28, 2019.
Office Action received for U.S. Appl. No. 14/853,780, dated Nov. 6, 2017.
Office Action received for U.S. Appl. No. 14/853,780, dated Oct. 12, 2016.
Office Action received for U.S. Appl. No. 15/481,806, dated Feb. 28, 2019.
Office Action received for U.S. Appl. No. 15/481,806, dated Jul. 29, 2020.
Office Action received for U.S. Appl. No. 15/481,806, dated Oct. 12, 2018.
Office Action received for U.S. Appl. No. 15/481,823, dated Dec. 9, 2019.
Office Action received for U.S. Appl. No. 15/481,823, dated Feb. 28, 2019.
Office Action received for U.S. Appl. No. 15/628,379, dated Apr. 30, 2018.
Office Action received for U.S. Appl. No. 15/691,588, dated Jan. 2, 2019.
Office Action received for U.S. Appl. No. 15/836,555, dated Jul. 14, 2020.
Office Action received for U.S. Appl. No. 16/287,884, dated Jul. 30, 2020.
Office Action received for U.S. Appl. No. 16/391,909, dated Dec. 1, 2020.
Office Action received for U.S. Appl. No. 16/456,295, dated Jul. 22, 2020.
Office Action received for U.S. Appl. No. 16/456,303, dated Apr. 9, 2020.
Ohtake, et al., "The Biodegradability of Polyethylene", Material Life, vol. 6, Issue 3, 1994, pp. 125-133.
Ojeda, et al., "Degradability of linear polyolefins under natural weathering, Polymer Degradation and Stability," 2011, pp. 703-707.
Ojeda, Telmo, et al., "Polymer Degradation and Stability" Available as early as Dec. 16, 2010 at www.elsevier.com/locat/polydegstab, 5 pages.
Oluz, Zehra and Teoman Tincer, "Additives for ultraviolet-induced oxidative degradation of low-density polyethylene", J. Appl. Polym. Sci., 133, 43354, Jan. 18, 2016, Wiley Online Library, DOI: 10.1002/app.43354, Accessed Apr. 21, 2018.
PCT International Search Report and the Written Opinion for Application No. PCT/US/18/026610, dated Jul. 13, 2018, 10 pages.
PCT International Search Report and the Written Opinion for Application No. PCT/US17/68492, dated Mar. 16, 2018, 10 pages.
PCT Search Report and Written Opinion dated Sep. 14, 2016 for PCT Application No. PCT/US16/40092, 8 pages.
PCT Search Report and Written Opinion dated Sep. 15, 2016 for PCT Application No. PCT/US16/40104, 10 pages.
Pearce "Biodegradable plastic bags carry more ecological harm than good" The Guardian, Jun. 18, 2009.
Requirement for Restriction/Election received for U.S. Appl. No. 16/391,909, dated Sep. 8, 2020.
Ruchuan et al., "Study on Starch-Polyethylene Film", Journal of Tianjin University, No. 2, 1990, pp. 23-29.
S.K. Nayak "Biodegradable PBAT/Starach Nanocomposites" Polymer-Plastics Technology and Engineering, 2010, pp. 1406-1418.
Santos, R. A. L. et al., "Starch/Poly (Butylene Adipate-Co-Terephthalate)/Montmorillonite Films Produced by Blow Extrusion". Quim. Nova 2014, 37(6), 937-942. (Year: 2014).
Sashiwa et al., "Microbial Degradation Behavior in Seawater of Polyester Blends Containing Poly(3-hydroxybutyrate-co-3-hydroxyhexanoate) (PHBHHx),"Mar. Drugs, vol. 16, 2018, 34, 11 pages.
Schwach et al., "Starch-based biodegradable blends: morphology and interface properties", 2004, Polymer International, vol. 53, pp. 2115-2124, DOI: 10.1002/pi.1636.
Shahin, "In-situ Nano Fibrillation of Polyethylene Terephthalate (PP) in Polypropylene (PP) through Spunbond Process,"Department of Mechanical and Industrial Engineering, 2019, 89 pages.
Shang, Jing, et al. "Photocatalytic Degradation of Polystyrene Plastic under Fluorescent Light." Environmental Science & Technology, Sep. 5, 2003, 37 (19), pp. 4494-4499. American Chemical Society, DOI: 10.1021/es0209464. Accessed Apr. 20, 2018.
Shogren et al. "Biodegradation of starch/polylactic acid/poly(hydroxyester-ether) composite bars in soil" Polymer Degradation and Stability 79 (2003) 405-411.
Sumathi, Tirupati et al., "Production of Laccase By *Cochliobolus* sp. Isolated from Plastic Dumped Soils and Their Ability to Degrade Low Molecular Weight PVC", Biochemistry Research International 2016 (2016): 9519527. PMC. Web. Apr. 16, 2018.
Tang, et al., "Recent Advances in Starch, Polyvinyl Alcohol Based Polymer Blends, Nanocomposites and their Biodegradability" Carbohydrate Polymers, 2011, vol. 85, pp. 7-16.
Tena-Salcido et al. "Effect of Morphology on the Biodegradation of Thermoplastic Starch in LDPE/TPS Blends" Polymer Bulletin, vol. 60, No. 5, Jan. 30, 2008, pp. 677-688.
Thakore, I.M., et al., "Studies on Biodegradability, morphology and thermo-mechanical properties of LDPE/modified starch blends" published in The European Polymer Journal, vol. 37 2001, pp. 151-160.
The SPC Position Against Biodegradability Additives for Petroleum-Based Plastics Sustainable Packaging Coalition, http://www.sustainablepackaging.org/content/?type=5&id=position-against-biodegradability-additives-for-petroleum-based-plastics Retreived on Sep. 19, 2017, 5 pages.
Thryft, Ann R, "Biodegradable Plastics Standard to Bust Landfill Waste", ENSO Plastics, Nov. 15, 2011. http://ensoplastics.com/theblog/?p=535, Accessed Apr. 23, 2018.
Tokiwa, et al., "Biodegradability of Plastics" in the International Journal of Molecular Sciences, Aug. 26, 2009, vol. 10, pp. 3722-3742.
Transition Metal Salts, Oxo-biodegradable Plastics Association, http://www.biodeg.org/index.html. Accessed Apr. 20, 2018.
Turley "Coca-Cola Collaborates on Bio-PET Project" ChemistryWorld, Jun. 11, 2012, accessed Apr. 6, 2017 at https://www.chemistryworld.com/news/coca-cola-collaborates-on-bio-pet-project/5091.article, 2 pages.
U.S. Appl. No. 15/481,823, filed Apr. 7, 2017, LaPray.
U.S. Application Filed on Apr. 7, 2017, by LaPray, U.S. Appl. No. 15/481,806.
U.S. Application Filed on Apr. 23, 2019, by LaPray, U.S. Appl. No. 16/391,909.
U.S. Application Filed on Aug. 21, 2020, by LaPray, U.S. Appl. No. 16/999,542.
U.S. Application Filed on Aug. 30, 2017, by LaPray., U.S. Appl. No. 15/691,588.
U.S. Application Filed on Feb. 27, 2019, by LaPray, U.S. Appl. No. 16/287,884.
U.S. Application Filed on Jun. 20, 2017, by LaPray, U.S. Appl. No. 15/628,379.
U.S. Patent Application filed on Jul. 10, 2020 by LaPray, U.S. Appl. No. 16/925,747.
U.S. Patent Application filed on Jul. 10, 2020 by LaPray, U.S. Appl. No. 16/925,952.
Van Soest et al. "Crystallinity in Starch Plastics: Consequences for Material Properties" Trends in Biotechnology, vol. 15, No. 6, Jun. 1, 1997, pp. 208-213.
Vargha et al., "Behavior of Polyethylene Films in Soil, Periodica Polytechnica Chemical Engineering," DOI: 10.3311/PPch. 8281, Creative Commons Attribution, 2016, pp. 60-68.
Vargha, et al., "Behavior of Polyethylene Films in Soil" published in Periodica Polytechnica Chemical Engineering, Nov. 5, 2015 pp. 60-68.
Woottikanokkhan, et al., "Effect of Blending Conditions on Mechanical, Thermal, and Rheological Properties of Plasticized Polyflactic acid)/Maleated Thermoplastic Starch Blends," Journal of Applied Polymer Science, 2012, vol. 124, pp. 1012-1019.

(56) References Cited

OTHER PUBLICATIONS

Yoshida, et al., "A Bacterium that Degrades and Assimilates Polyfehylene terphthalate)" Sciense Magazine vol. 351 Issue 6278 Mar. 11, 2016 pp. 1196-1199.
Yu et al., "Morphology and Mechanical Properties of Immiscible Polyethylene/Polyamide12 Blends Prepared by High Shear Processing," Chinese Journal of Polymer Science, 2017, 35(9):1132-1142.
Zhang et al., "Retrogradalion and Antiplasticization of Thermoplastic Starch," Richardson Centre for Functional Foods and Nutraceuticals, University of Manitoba, www.intechopen.com, 19 pages. 2012.
Zhang, et al. "Retrogradation and Antiplasticization of Thermoplastic Starch" Mar. 2012.
Zhong et al., "Biodegradable polymers and green-based antimicrobial packaging materials: A mini-review," Advanced Industrial and Engineering Polymer Research, vol. 3, 2020, pp. 27-35.
Machine translation of JP-2008013602-A (Year: 2008).
Non-Final Office Action received for U.S. Appl. No. 16/391,909, dated Dec. 1, 2020, 10 pages.
Notice of Allowance received for U.S. Appl. No. 15/481,806, dated Jan. 7, 2021, 11 pages.
Notice of Allowance received for U.S. Appl. No. 15/481,823, dated Dec. 9, 2020, 9 pages.
Notice of Allowance received for U.S. Appl. No. 15/481,823, dated Jan. 8, 2021, 2 pages.
Notice of Allowance received for U.S. Appl. No. 16/456,295, dated Dec. 15, 2020, 3 pages.
Notice of Allowance received for U.S. Appl. No. 16/456,295, dated Nov. 19, 2020, 11 pages.
"APR Position Statement—Degradable Additives Use in Bottles, Forms and Films" The Association of Postconsumer Plastic Recyclers, http://plasticsrecycling.org/about/position-statements, Apr. 27, 2015, 1 page.
"Background on Biodegradable Additives" BPI, Feb. 12, 2010.
"BPI Position on Degradable Additives" Feb. 2010, 6 pages.
"Case Study: Compostable vs Oxo Degradable" Natur Bag, Feb. 19, 2019.
"Compostable Plastics 101: An Overview of Compostable Plastics Sponsored by the California Organics Recycling Council" based on information and belief, available at least as early as 2012, 23 pages.
"Discover Polysaccharides" Available at http://polysac3db.cermav.cnrs.fr/discover_starch.html; Accessed Feb. 16, 2017, 10 pages.
"Environmentally Degradable Plastics," Leonardo Da Vinci Program, Contract Nol 1/98/2/05261 /PI/11.1.1b/CONT, 202 pages. May 4, 1999.
"French Proposal for Law on Biodegradable Plastics" Oxo-Biodegradable Plastics Association, Revised Oct. 31, 2013.
"Oxo-Biodegradable Plastics and Other Plastics with Additives for Degradation" European Bioplastics BackGround Oct. 2015, 5 pages.
"Position Paper on Degradable Additives" SPI Bioplastics Division, issued Feb. 2016.
"Report from the Commission to the European Parliament and the Council on the Impact of the Use of Oxo-Degradable Plastic, Including Oxo-Degradable Plastic Carrier Bags, on the Environment" European Commission, Brussels, Jan. 16, 2018.
"The Flexible Packaging Association Position on Degradable Additives" FPA, Jun. 21, 2010.
"What Are Oxo-biodegradable Additives" MJS Packaging, May 8, 2014.
"Biodegradation of starch-polyethylene films in soil and by microbial cultures", Nov. 1997, Dave, et al. World Journal of Microbiology and Technology, 13, 655-68., World Journal of Microbiology and Technology, 655-668, 13.
Ahmed et al. "Biodegradation of plastics: current scenario and future prospects for environmental safety." Environmental Science and Pollution Research 25.8 7287-7298. p. 7 col. 1 paragraph 2; Table 1; and Figure 1., Mar. 2018.
Applicant's Transmittal Letter labeled Information Disclosure Statement Under 37 CFR 1.97 dated Sep. 26, 2018.
Arevalo-Nino et al., "Starch-based extruded plastic films and evaluation of their biodegradable properties" Biodegradation 7:231-237, 1996.
Arvanitoyannis et al., Biodegradable films made from low density polyethylene (LDPE), rice starch and potato starch for food packaging applications: Part 1, Carbohydrate Polymers, vol. 36, (1998), pp. 89-104.
Bastioli et al. "Starch in Polymers Technology" ACS Symposium Series, Jan. 1, 2012, American Chemical Society/Oxford University Press, XP055490447, vol. 1114, pp. 87-112.
Biodegradable Plastics Standard to Bust Landfill Waste, ENSO Plastic Blog, printed Feb. 20, 2019, 3 pages.
Braskem "Life Cycle Assessment of Green Plastic" Available as early as Mar. 28, 2017, accessed at http://www.braskem.com_site.aspx_plastic-green, 18 pages.
Campo, E. Alfredo, Polymeric Materials and Properties, Science Direct, 2018.
Cardia Biohybrid, Film Blowing/ Blow Moulding Resin, Sep. 8, 2017.
Cardia Bioplastics FAQ [online] [site accessed Oct. 23, 2018] URL: http://www.cardiabioplastics.com/our-business/fag.
Cardia Compostable B-F, Blown Film Resin, Biodegradable during Composting in Professionally Managed Facilities, CBP Technical Data Sheet, Nov. 3, 2017, 2 pages. 2019.
Chen et al. "Environmental Degradation of Starch/Poly (Lactic Acid) Composite in Seawater" Apr. 6, 2010.
Chen et al., "Environmental Degradation of Starch/Poly(Lactic Acid) Composite in Seawater," Key and Open Laboratory of Marine and Estuarine Fisheries Ministry of Agriculture, East China Sea Fisheries Research Institute, Chinese Academy of Fishery Sciences, Polymers and Polymer Composites, vol. 19, No. 7, 2011, pp. 559-566.
Corn Starch/Fisher Scientific, 3 pages [online] [site accessed Sep. 18, 2020] url: https://www.fishersci.com/shop/products/corn-starch-2/S25580 (undated).
De Guzman "Coca-Cola produces 100% Bio-Based PET Bottle" Green Chemicals Blog, Jun. 9, 2015, 3 pages, accessed on Mar. 28, 2017 at https://greenchemicalsblog.com/2015/06/09/coca-cola-produces-100-bio-based-pet-bottle/ 3 pages.
Droge et al., WO 2016/134994 Machine Translation, Sep. 1, 2016 (Year: 2016).
Emmanuel Schwach "Starch-based biodegradable blends: morphology and interface properties," Polymer International, 2004, pp. 2115-2124.
English Abstract of BY 21006 C1. Apr. 2017.
Esmaeili, Atefeh, et al. "Biodegradation of Low-Density Polyethylene (LDPE) by Mixed Culture of Lysinibacillus xylanilyticus and Aspergillus niger in Soil." PLoS One 8(9): e71720, Sep. 23, 2013. https://doi.org/10.1371/journal.pone.0071720. Accessed Apr. 16, 2018.
Eyheraguibel, et al. "Characterization of oxidized oligomers from polyethylene films by mass spectrometry and NMR spectroscopy before and after biodegradation by a Rhodococcus rhodochrous strain" Chemosphere 184, 2017, pp. 366-374.
Final Office Action received for U.S. Appl. No. 14/853,725, dated Nov. 8, 2017.
Final Office Action received for U.S. Appl. No. 14/853,780, dated May 24, 2017.
Final Office Action received for U.S. Appl. No. 15/481,806, dated Nov. 6, 2019.
Final Office Action received for U.S. Appl. No. 15/481,823, dated Jul. 12, 2019.
Final Office Action received for U.S. Appl. No. 15/481,823, dated Jul. 20, 2020.
Final Office Action received for U.S. Appl. No. 15/481,823, dated Oct. 12, 2018.
Final Office Action received for U.S. Appl. No. 15/691,588, dated Dec. 9, 2019.
Final Office Action received for U.S. Appl. No. 15/836,555, dated Feb. 7, 2020.
Final Office Action received for U.S. Appl. No. 15/836,555, dated Nov. 30, 2020, 27 pages.

(56) References Cited

OTHER PUBLICATIONS

Fine Chemical Engineering Green Production Process, I st edition, edited by Qihuang Song, Guangdong Science & Technology Press, published on Mar. 31, 2006, p. 174.
Fujisawa, et al. "Degradation of Polyethylene and Nylon 66 by the Laccase-Mediator System" Journal of Polymers and the Environment, vol. 9, Issue 3, 2001, pp. 103-108.
Gadhave et al., Starch Based Bio-Plastics: The Future of Sustainable Packaging, Open Journal of Polymer Chemistry, 2018, vol. 8, pp. 21-33.
Gilfillan, "Developing Starch-Based Polymer Composites", Doctor of Philosophy, 2015, pp. 1-128.
Gupta, Apeksha et al. "Visible Range Photocatalysts for Phase Photocatalytic Degradation of Polyethylene and Polyvinyl Chloride" Journal of the Chilean Chemical Society, [S.I.], v. 62, n. 1, Jun. 2017. ISSN 0717-9707. <https://jcchems.com/index.php/JCCHEMS/article/view/156>. Accessed: Apr. 20, 2018.
Huagong et al., "Green Manufacturing Process of Fine Chemical Industry", 2006, Guangdong Science & Technology Press (National Outstanding Press).
Ibbrucker, Constance "Can Additives make plastics biodegradable?" Bioplastics Magazine Jan. 2017, 1 page.
Examiner Interview Summary received for U.S. Appl. No. 15/836,555, dated Mar. 29, 2021, 2 pages.
Non-Final Office Action received for U.S. Appl. No. 15/836,555, dated Apr. 13, 2021, 12 pages.
Non-Final Office Action received for U.S. Appl. No. 16/425,397, dated Feb. 5, 2021, 13 pages.
Notice of Allowance received for U.S. Appl. No. 15/691,588, dated Feb. 24, 2021, 11 pages.
Notice of Allowance received for U.S. Appl. No. 15/836,555, dated May 3, 2021, 6 pages.
Notice of Allowance received for U.S. Appl. No. 16/391,909, dated May 4, 2021, 9 pages.
"Mask fire, environmental protection fire, degradable meltdown cloth will be the next tueyere?", https://mp.weixin.qq.com/s/r5PmKPpF1V2TkW9AYZQ2EA, Jun. 3, 2020.
"Succeeded in developing a pregelatinized rice manufacturing device without cooking rice", Yamagata University press release material, Aug. 6, 2013. Partial English translation provided.
Frankland, Jim, Extrusion: Where's the Data? The Importance of Melt Strength in Extrusion, Plastics Technology, https://www.ptonline.com/articles/what-about-melt-strength, Dec. 18, 2020.
La Fuente, et al., Ozonation of Cassava Starch to Produce Biodegradable Films, Sep. 5, 2019, International Journal of Biological Macromolecules, 713-720, 141 (2019).
Machine translation of CN 103087482 (Year: 2013).
Non-Final Office Action received for U.S. Appl. No. 16/925,747, dated Aug. 11, 2021, 15 pages.
Non-Final Office Action received for U.S. Appl. No. 16/925,952, dated Oct. 15, 2021, 9 pages.
Notice of Allowance received for U.S. Appl. No. 16/425,397, dated Jun. 18, 2021, 8 pages.
U.S. Appl. No. 15/481,823.
U.S. Appl. No. 16/925,705.
U.S. Appl. No. 16/925,747.
U.S. Appl. No. 14/853,725, filed Sep. 14, 2015.
U.S. Appl. No. 15/481,806, filed Apr. 7, 2017.
Sumathi et al., "Production of laccase by *Cochliobolus* sp. isolated from plastic dumped soils and their ability to degrade low molecular weight PVC," Biochemistry research international 2016, vol. 2018, Jan. 1, 2016, pp. 1-10.
Final Office Action received for U.S. Appl. No. 16/925,747, dated Jan. 18, 2022, 12 pages.
Notice of Allowance received for U.S. Appl. No. 16/925,952, dated Feb. 9, 2022, 7 pages.
U.S. Appl. No. 15/836,555, filed Dec. 8, 2017.
U.S. Appl. No. 16/925,705, filed Jul. 10, 2020.
U.S. Appl. No. 16/925,747, filed Jul. 10, 2020.
U.S. Appl. No. 17/327,536, filed May 21, 2021.
U.S. Appl. No. 17/327,577, filed May 21, 2021.
U.S. Appl. No. 17/327,590 filed May 21, 2021.
U.S. Appl. No. 63/033,676, filed Jun. 2, 2020.
"Practical Technology on Improving Plastic Function", Edition 1,Author XU, Tongkao,p. 99, China Light Industry Press.
Non-Final Office Action received for U.S. Appl. No. 17/358,619, dated Jan. 30, 2023, 9 pages.
Restriction Requirement received for U.S. Appl. No. 17/327,536, dated Dec. 2, 2022, 7 pages.
Restriction Requirement received for U.S. Appl. No. 17/327,577, dated Dec. 2, 2022, 6 pages.
Restriction Requirement received for U.S. Appl. No. 17/327,590, dated Dec. 2, 2022, 6 pages.
Song et al., "Starch nanoparticle formation via reactive extrusion and related mechanism study", Carbohydrate Polymers, vol. 85, 2011, pp. 208-214.
"Novel Soil Biodegradable Mulch Film" Radical plastics, Excerpts from the Final Technical Report. Feb. 10, 2021.
Notice of Allowance received for U.S. Appl. No. 16/925,952, dated May 16, 2022, 2 pages.
Non-Final Office Action received for U.S. Appl. No. 16/925,747, dated Aug. 23, 2022, 12 pages.
Otake et al., Development of biodegradable LDPE compound and the estimation of its biodegradability and its application to field of civil engineering, Oct. 10, 1996, Journal of the Chemical Society of japan, 9, 10, 1996, p. 853-860, Issue 298, https://www.osti.gov/etdeweb/biblio/438201.
Tachibana, Y. et al., "Chemical Synthesis of Fully Biomass-Based Poly(butylene succinate) from Inedible-Biomass-Based Furfural and Evaluation of Its Biomass Carbon Ratio". Biomacromolecules 2010, 11, 2760-2765. (Year: 2010).

* cited by examiner

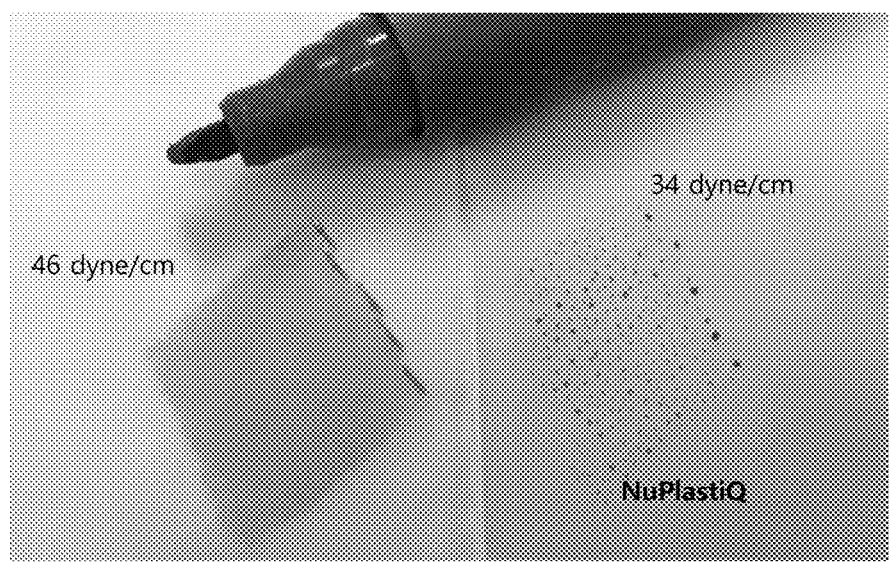
*FIG. 5*
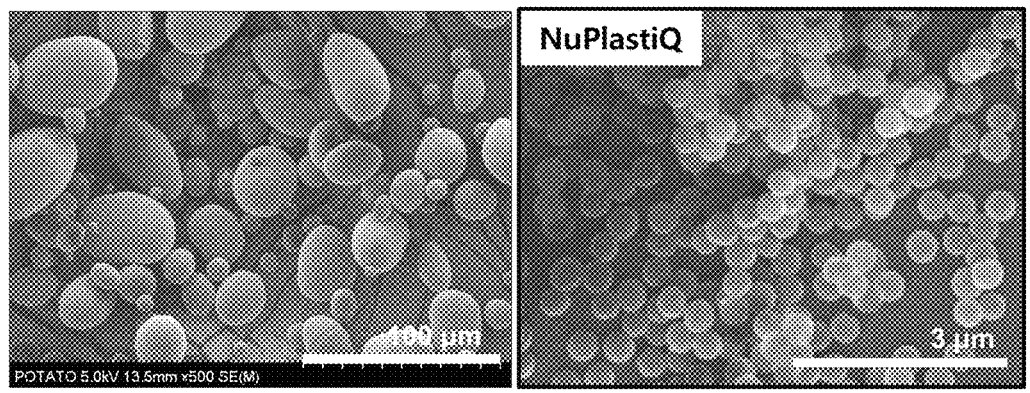
*FIG. 6A*
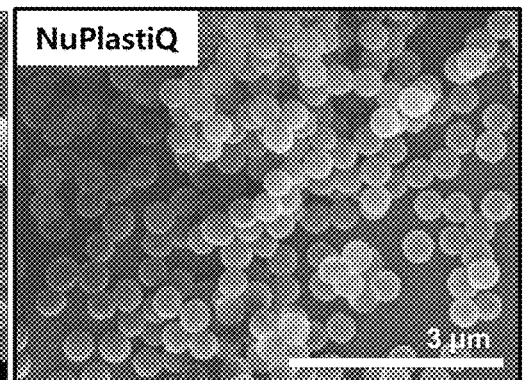
*FIG. 6D*
*FIG. 6B*
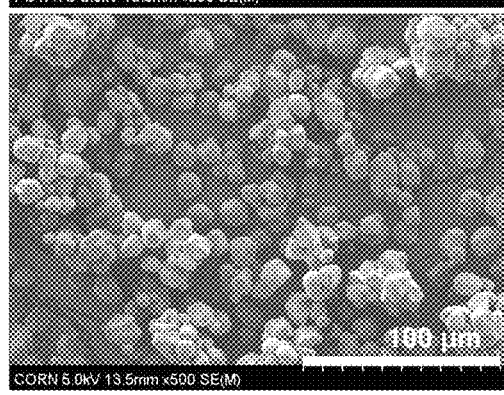
*FIG. 6C*
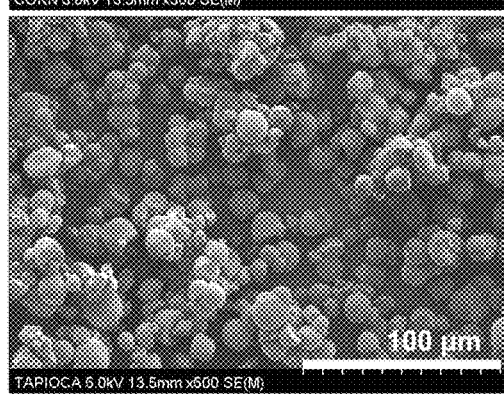

POLYMER AND CARBOHYDRATE-BASED POLYMERIC MATERIAL BLENDS WITH PARTICULAR PARTICLE SIZE CHARACTERISTICS

CROSS-REFERENCE TO RELATED APPLICATIONS

This application claims the benefit under 35 U.S.C. 119(e) of U.S. Application Nos. 62/872,582 (21132.27); 62/939,460 (21132.27.1), 62/962,706 (21132.30) filed Jul. 10, 2019, Nov. 22, 2019, and Jan. 17, 2020, respectively. This application is also a continuation in part under 35 U.S.C. 120 of U.S. application Ser. No. 15/691,588 (21132.7) filed on Aug. 30, 2017 which is a continuation in part under 35 U.S.C. 120 of U.S. application Ser. No. 14/853,725 (21132.8) filed on Sep. 14, 2015 which claims the benefit under 35 U.S.C. 119(e) of U.S. Provisional Patent Application No. 62/187,231 filed on Jun. 30, 2015. U.S. application Ser. No. 15/691,588 (21132.7) is also a continuation in part under 35 U.S.C. 120 of U.S. application Ser. No. 14/853,780 (21132.6) filed on Sep. 14, 2015, and a continuation in part under 35 U.S.C. 120 of U.S. application Ser. No. 15/481,806 (21132.1) and Ser. No. 15/481,823 (21132.2), both filed on Apr. 7, 2017. U.S. application Ser. No. 15/691,588 (21132.7) also claims the benefit under 35 U.S.C. 119(e) of U.S. Provisional Patent Application No. 62/440,399 (21132.10) filed on Dec. 29, 2016, and U.S. Provisional Patent Application No. 62/442,432 (21132.11) filed on Jan. 4, 2017. The entire contents of each of the foregoing is incorporated by reference herein. Each of U.S. Provisional Patent Application No. 62/483,109 (21132.5), filed Apr. 7, 2017; U.S. patent application Ser. No. 16/391,909 (21132.14.1) filed Apr. 23, 2019; U.S. patent application Ser. No. 16/425,397 (21132.20.1) filed May 29, 2019; U.S. Patent Application No. 63/033,676 (21132.31) filed Jun. 2, 2020; and Applicant's U.S. Non-Provisional patent application No. 16/925,747 (21132.30.1), filed the same day as the present application, is also incorporated by reference herein, in its entirety.

BACKGROUND

Traditional petrochemical-based plastics are formulated to be strong, lightweight, and durable. For this reason, they are used in large quantities in countless consumer products. However, these plastics are generally not sourced from sustainable materials, are not biodegradable to a significant extent, and as a result, hundreds of millions of tons of plastic persist in landfills or in other natural environments (oceans, other waterways, in soil, etc.). In trying to reduce the amount of plastic waste, some articles typically produced using petrochemical-based plastics are being produced using more rapidly biodegradable materials, and/or include a fraction of components sourced from renewable sources.

Most petrochemical-based plastics materials, such as large quantities of polyethylene and polypropylene, as well as numerous other plastics (polyethylene terephthalate polyester, polystyrene, ABS, polyvinyl chloride, polycarbonate, nylon, and the like) are typically not readily biodegradable. Such is typically the case even for so called "green" plastics of such materials (e.g., green PE), which may be sourced from renewable sources (e.g., plant sources that are renewable within less than 100 years), rather than petro-chemical feedstocks. Even where it is possible to source some components of such materials from a renewable source, such materials tend to be significantly more expensive than available alternatives, and/or provide inferior physical properties. There are various tests for confirming green renewable content in plastics or other materials, e.g., as the ratio of $C^{14}$ to $C^{12}$ is elevated in renewable materials containing carbon, as compared to fossil fuel sourced materials. Such tests will be apparent to those of skill in the art.

While some of the literature describes attempts to incorporate starch or starch derivatives into blends of petrochemical or other plastic materials (e.g., polyolefins such as polyethylene), such attempts have met with little if any commercial success, due at least in part to resulting higher cost and/or inferior physical properties of the blends.

It would be an advantage in the art to provide the ability to intimately and homogenously blend starch-based polymeric materials with a base polymeric resin material, in a manner that would consistently provide for comparable (or even improved) physical properties, or would at least allow introduction of an inexpensively sourced renewable component into such a blend in a substantially homogenous manner, with very small particle size, that would allow the blend to be used as a replacement for conventional materials, with improved sustainability characteristics, at comparable cost.

SUMMARY

Applicant's copending applications as incorporated by reference above disclose various methods and blends for lending improved biodegradability to plastic articles, and/or for increasing strength for such blends, as compared to the conventional material that does not include the carbohydrate-based polymeric material. While such blends and methods have provided significant success, one difficulty that remains has been achieving consistency in desired physical or other properties, e.g., from batch to batch. Applicant has more recently discovered that improved consistency in physical strength and other characteristics can be achieved where it is ensured that the carbohydrate-based component is intimately mixed and well distributed into the other polymeric resin material (e.g., a polyolefin such as polyethylene, or any of various other plastic materials), so as to consistently have a very small average particle size, with tight distribution of particle sizes, within the blended matrix of the different polymeric materials.

For example, such an embodiment is directed to an article comprising a starch-based polymeric material formed from at least a first starch and a plasticizer, blended with another polymeric material, where the starch-based polymeric material is intimately dispersed within the other polymeric material so as to exhibit an average particle size volume of less than 10 $\mu m^3$, less than 5 $\mu m^3$ or less than 1 $\mu m^3$. Another way to characterize the small starch-based particles is by average particle size (e.g., visible diameter in random SEM cross-section), which is less than 2 $\mu m$, or even less than 1 $\mu m$. Yet another way to characterize the small starch particles is by average particle density (i.e., concentration) of the very small starch particles, within the blend. For example, because the particles are significantly smaller in size than what is typically provided in more conventional existing blends that may include a starch-based polymeric material component, at any given starch loading, the number of particles will be significantly higher, because of their smaller size. For example, the presently contemplated blends may have a minimum average particle density, e.g., at a particular loading of the starch-based polymeric material. For example, an average particle density of at least $1 \times 10^9$ particles/$mm^3$ (about 15,000 particles/$mil^3$) may be provided, e.g., for a starch-based polymeric material loading of 5% to 40% (e.g., about 20-25%). Particle density of course depends on particle size and loading of the starch-based polymeric material. Starch-based polymeric materials suitable for use in forming such blends are currently available commercially from Applicant under the tradename "NuPlastiQ" (e.g., particularly the 2019 and later batches or grades thereof).

In addition to very small particle size (e.g., less than 2, or even less than 1 μm in diameter), the particle sizes of the starch-based or other carbohydrate-based polymeric material are very uniformly distributed around the very small average particle size. For example, where the average particle size may be about 0.5 μm, there may be very few if any particles that are larger than 2 μm, or larger than 1.5 μm. Stated another way, the standard deviation from the mean particle size may be very low. For example, the standard deviation may be less than 100%, less than 50%, less than 40%, or less than 30% that of the mean. By way of specific example, for a mean particle size of 0.5 μm, the standard deviation may thus be less than 0.5 μm, less than 0.25 μm, less than 0.2 μm, or less than 0.15 μm.

In addition to controlling the presence of significantly larger sized particles of the starch-based polymeric material, there may also be tight distribution relative to any extremely small starch-based polymeric material particles as well. For example, while for a mean particle size of 0.5 μm, there may be a significant fraction of particles sized from 0.3 to 0.4 μm, there may be very few, if any particles sized less than 0.2 μm, or even from 0.2 to 0.3 μm.

Such very small particle size and tight distribution has been found by Applicant to provide for improved consistency in the ability to achieve specifications demanded by a given customer, e.g., with respect to strength or other physical characteristics. Such very small particle size and tight distribution of particle sizes is also believed to play a role in accelerating biodegradability of the blend as a whole and/or total extent of biodegradation of the blend. The biodegradability of blends of Applicant's NuPlastiQ starch-based polymeric material blended with various other conventional polymeric materials is described in various applications, already incorporated by reference. The ability to now more carefully control and monitor particle size and particle size distribution allows Applicant to achieve better consistency in achieving such superior results, e.g., from batch to batch.

As described in Applicant's previous applications, exemplary conventional polymeric materials that may serve as the matrix material into which the present starch-based polymeric materials may be blended include, but are not limited to polyethylene, polypropylene, and other polyolefins, polystyrene, high impact polystyrene copolymers, polyesters (polyethylene terephthalate, PBAT, PLA, PHA, etc.), ABS, polyvinyl chloride, nylon, polycarbonate, and others. Combinations of various materials may be employed.

Blends of such plastics with the carbohydrate-based polymeric material, NuPlastiQ, may be heated (e.g., melted) for use in forming extruded plastic products, injection molded plastic products, blow molded plastic products, blown film plastic products, extruded or cast sheet or films, thermoformed plastic products, foamed plastic products, rotomolded plastic products, fiber plastic products, and the like using standard equipment of the plastics industry.

Further features and advantages of the present invention will become apparent to those of ordinary skill in the art in view of the detailed description of preferred embodiments below.

BRIEF DESCRIPTION OF THE DRAWINGS

In order that the manner in which the above-recited and other advantages of the invention are obtained, a more particular description of the invention briefly described above will be rendered by reference to specific embodiments thereof such as illustrated in the appended drawings. Understanding that these drawings depict only typical embodiments of the invention and are not therefore to be considered to be limiting of its scope, the invention will be described and explained with additional specificity and detail through the use of the accompanying drawings.

FIG. 5 is a photograph showing the relative hydrophobicity characteristics of a film comprising NuPlastiQ blended with another polymeric material compared to another film comprising a conventional starch blended with the same polymeric material, as tested with a Dyne pen, showing how the NuPlastiQ is far more hydrophobic.

FIGS. 6A-6C are SEM images showing potato starch particles, corn starch particles, and cassava (tapioca) starch particles, respectively.

FIG. 6D is an SEM image showing exemplary NuPlastiQ GP particles, which are substantially uniformly spherical, and significantly smaller than the particles of FIGS. 6A-6C. These small particles are formed from a blend of corn and potato starch, as starting materials.

DETAILED DESCRIPTION

I. Definitions

Figure 1:
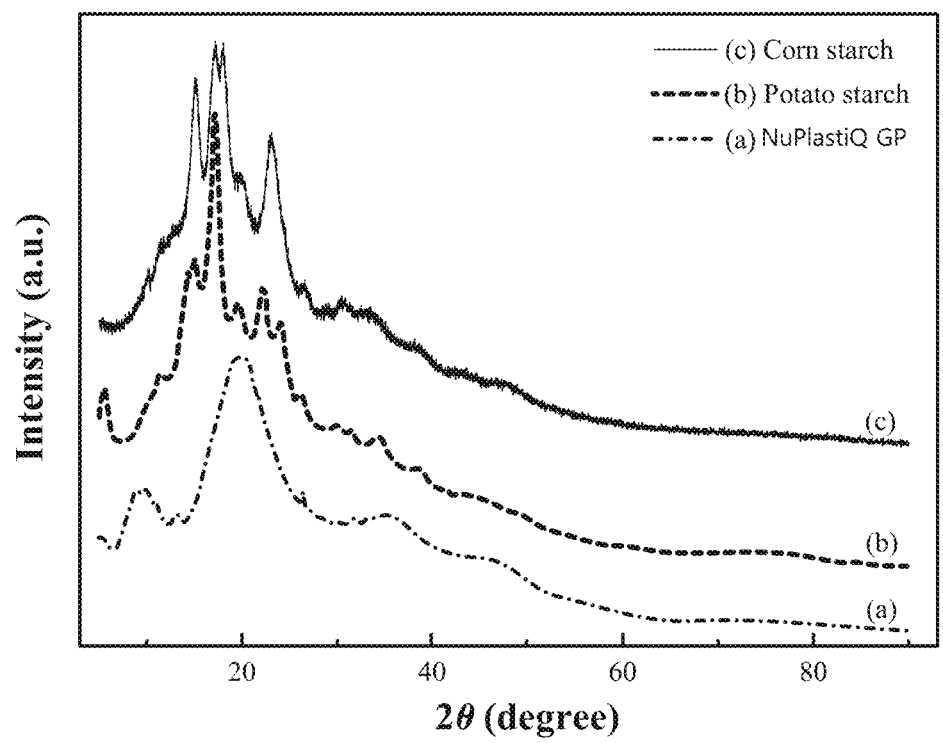
FIG. 1 shows X-ray diffraction (XRD) patterns for NuPlastiQ GP, a carbohydrate-based polymeric material commercially available from BioLogiQ as compared to XRD patterns for native corn starch and native potato starch, which are used to form the NuPlastiQ GP. Significantly reduced crystallinity is readily apparent.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

The terms "a," "an," "the" and similar referents used in the context of describing the inventive features (especially in the context of the following claims) are to be construed to cover both the singular and the plural, unless otherwise indicated herein or clearly contradicted by context. Thus, for example, reference to a "starch" can include one, two or more starches.

"Film," as used herein, refers to a thin continuous article that includes one or more polymeric materials that can be used to separate areas or volumes, to hold items, to act as a barrier, and/or as a printable surface.

"Bag," as used herein, refers to a container made of a relatively thin, flexible film that can be used for containing and/or transporting goods.

"Bottle," as used herein, refers to a container that can be made from the presently disclosed plastics, typically of a thickness greater than a film, and which typically includes a relatively narrow neck adjacent an opening. Such bottles may be used to hold a wide variety of products (e.g., beverages, personal care products such as shampoo, conditioner, lotion, soap, cleaners, and the like).

Unless otherwise stated, all percentages, ratios, parts, and amounts used and described herein are by weight. Unless stated otherwise, molecular weight values are for weight average molecular weights.

Numbers, percentages, ratios, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values include at least the variation to be expected in a typical manufacturing process, and may include values that are within 25%, 15%, 10%, within 5%, within 1%, etc. of a stated value. Furthermore, the terms "substantially", "similarly", "about" or "approximately" as used herein represent an amount or state close to the stated amount or state that still performs a desired function or achieves a desired result. For example, the term "substantially" "about" or "approximately" may refer to an amount that is within 25% of, within 15% of, within 10% of, within 5% of, or within 1% of, a stated amount or value.

Some ranges are disclosed herein. Additional ranges may be defined between any values disclosed herein as being exemplary of a particular parameter. All such ranges are contemplated and within the scope of the present disclosure. Further, recitation of ranges of values herein is intended to serve as a shorthand method of referring individually to each separate value falling within the range. Unless otherwise indicated herein, each individual value is incorporated into the specification as if it were individually recited herein.

All numbers expressing quantities of ingredients, constituents, conditions, and so forth used in the specification and claims are to be understood as being modified in all instances by the term "about". Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The phrase 'free of' or similar phrases as used herein means that the composition comprises 0% of the stated component, that is, the component has not been intentionally added to the composition. However, it will be appreciated that such components may incidentally form under appropriate circumstances, may be incidentally present within another included component, e.g., as an incidental contaminant, or the like.

Figure 7:
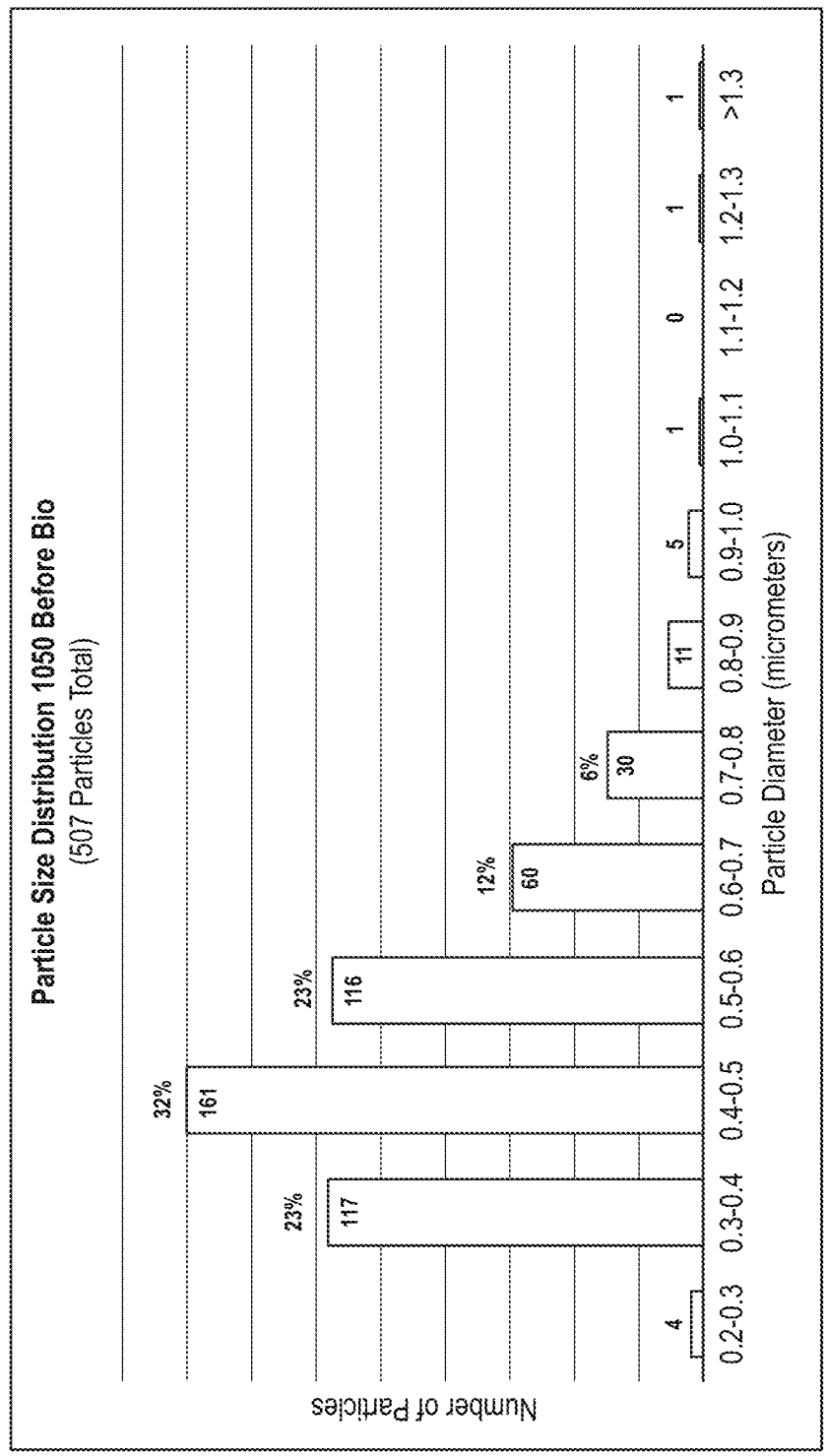
FIG. 7 shows an exemplary particle size distribution for NuPlastiQ particles used in the present blends.

The phrase 'substantially free of' or similar phrases as used herein means that the composition preferably comprises 0% of the stated component, although it will be appreciated that very small concentrations may possibly be present, e.g., through incidental formation, incidental contamination, or even by intentional addition. Such components may be present, if at all, in amounts of less than 1%, less than 0.5%, less than 0.25%, less than 0.1%, less than 0.05%, less than 0.01%, less than 0.005%, or less than 0.001%. Particularly in the context of statements that the small particle starch is substantially free of particles sized larger than a given size (e.g., 1.5 µm), it is meant that the content of such may be below the fractions noted above, or that such content is not detectable within the blend or the small particle starch. Such percentages may be on a weight basis, or on a basis based on the number of particles (e.g., as shown in FIG. 7)

The term "non-biodegradable" as used herein with regard to a material means that the native material (free of additives added to render it biodegradable) does not degrade (particularly biodegrade), e.g., to carbon dioxide and/or methane to a significant extent in a reasonable limited time period (e.g. one year, 3 years, or 5 years) when exposed to various simulated disposal conditions, (e.g., ASTM D-5338, ASTM D-5511, and/or ASTM D-6691). However, it is understood that given enough time and exposure to conditions of sunlight, oxygen and degrading microbes, most polymeric materials (e.g., even those that are typically considered "non-biodegradable") will eventually degrade or even biodegrade, usually to some limited extent, over an extended time (e.g., decades or centuries).

The term "biodegradable" as used herein with regard to a material means that the material as described herein does biodegrade to base molecules such as carbon dioxide, methane and/or water, within a reasonable limited time frame (e.g., 5 years, 3 years, 2, years, 1 year, etc.) under such conditions (e.g., ASTM D-5338, ASTM D-5511, ASTM D-5526 and/or ASTM D-6691).

In reference to various standardized tests (e.g., ASTM or other tests), it will be understood that reference to any such standard refers to the latest update (if any) of such standard.

The term "particle size" as used herein refers to a length, width, or diameter (in the case of generally spherical particles) of particles of the carbohydrate-based polymeric material included in the present blends. For example, the "particle size" may refer to the largest length, width or diameter measurement of a given particle. Such measurement may be made in conjunction with an SEM imaged cross-section, where the size (e.g., visible diameter) of such particles can be measured. By way of example, volume of a substantially spherical particle may be calculated as $4/3 \cdot \pi \cdot r^3$, using a measured particle radius (i.e., half a diameter). Volume of other shaped particles could also be determined, e.g., by other various suitable methods.

The term "modified" as used, e.g., in describing "modified starch" modified polysaccharide, and the like, refers to physical and/or chemical modifications, including the conversion of a starting starch material to one that includes a lower molecular weight. Such mechanical and/or chemical modifications may include mechanical modification of amylopectin starch component(s) to a more linear amylose structure. The foregoing descriptions are merely exemplary, and it will be appreciated that numerous modifications to such starch components are possible. Applicant's NuPlastiQ material is an example of a modified starch.

While the NuPlastiQ starch-based polymers described herein are an example of starch-based material that can provide the benefits described herein, it will be appreciated that the scope of the present invention extends broadly, to other starches or starch-based materials that might exhibit similar small particle size characteristics (e.g., developed at some future time), or even to a material that may be synthesized from starting materials other than starch, which may achieve similar results due to the presence of the same or similar chemical structures or functional groups. For example, if a material having a chemical structure similar or identical to NuPlastiQ were synthesized (e.g., in a reactor) starting from non-starch materials, such is also within the scope of the present invention.

II. Introduction

The present disclosure is directed to, among other things, blends of starch-based or other carbohydrate-based polymeric materials blended with another polymeric material, where the starch or other carbohydrate-based polymeric material is intimately and homogeneously dispersed within the other polymeric material, so as to exhibit extremely small average particle size, with relatively tight particle size distribution characteristics. While the literature describes earlier blends of starch or TPS materials with polyethylene or other polymeric resins, there have been significant incompatibilities between such starch-based components and typical polymeric resins with which they are blended, e.g., typically requiring significant fractions of compatibilizers to even achieve the blend (e.g., at least 9% of such expensive compatibilizers in numerous references to Broyles). Even where such compatibilizers are present, as a practical matter, it has not been possible to achieve an intimate, homogenous dispersion of the starch-based material within the other polymeric material. Rather, what occurs is the aggregation of relatively large starch particles (islands) within the matrix, and it can be extremely difficult to achieve good dispersion of particles.

In addition, the presence of such large starch particles within the blend exacerbates problems associated with attempts to form very thin films, particularly where such films are blow formed. The present invention provides a starch-based polymeric material that has very small "domain" size, and assumes very small particle sizes when blended into the other polymeric material with which it is paired. The present recently available grades of NuPlastiQ (or another similar carbohydrate-based polymeric material yet to be developed) are also significantly more hydrophobic than conventional starch or TPS materials, and include other characteristics that allow them to exhibit very small average particle size values, with tight distribution around the average particle size, such that the blend is substantially void of relatively large starch or starch-based polymeric material particles, which would interfere with the ability to blow a thin film, and which also are believed to interfere with the ability to consistently achieve desired high strength characteristics. Such large particles may also indirectly limit biodegradability of composite blends such as where the starch-based material is present as a relatively fewer number of large particles, with large domains of the matrix polymer material, including substantially no starch therein. If the starch is present as a far higher number of very small particles homogenously distributed, such as in the present invention, the starch may somehow aid in whatever mechanism is responsible for lending significantly increased biodegradability to the polymeric material (e.g., even polyethylene) with which the starch-based polymeric material is blended. Faster biodegradability and enhanced strength characteristics are described in Applicant's earlier applications, although the ability to now consistently achieve small particle sizes, with tight particle size distribution, enhances the ability of Applicant to consistently deliver the desired characteristics (e.g., particularly strength, although also believed to affect biodegradability).

The present articles (films or otherwise) can be produced by mixing the carbohydrate-based polymeric material with the other polymeric material, in any order, heating the mixture, and molding (e.g., injection molding) the mixture, extruding the mixture, blow molding the mixture, blow-forming the mixture (e.g., forming a blown film), thermo-forming the mixture, or the like. Any of various plastic manufacturing processes suitable for use in forming a wide variety of articles can be used with the present blends.

The articles described herein can be produced in the form of any conceivable structure, including, but not limited to bottles, boxes, other containers, sheets, films, bags, and the like. Thin films for bags and film wraps (e.g., for wrapping around or over a product) can easily be made using blown film equipment.

Examples of suitable carbohydrate-based or starch-based polymeric materials that have been developed to consistently provide for very small particle sizes, and tight particle size distribution are available from BioLogiQ, under the tradename "NuPlastiQ". Specific examples of NuPlastiQ include, but are not limited to NuPlastiQ GP and NuPlastiQ CG. Specific characteristics of such NuPlastiQ materials will be described in further detail herein. Other carbohydrate-based or starch-based polymeric materials may also be suitable for use so long as they provide the very small particle size and tight particle size distribution characteristics described herein. 2019 and later grades of such NuPlastiQ materials provide such small particle size characteristics.

Applicant also provides masterbatch blends of NuPlastiQ and conventional polymeric materials under the tradename BioBlend, e.g., including, but not limited to, BioBlend XP, BioBlend XD, BioBlend MB, BioBlend BC, and BioBlend CG. Such masterbatches may contain relatively higher proportions of the polysaccharide (e.g., starch) or modified polysaccharide (NuPlastiQ) which may be down-blended with the other polymeric material (e.g., a polyolefin) prior to forming the final product.

In polymer/NuPlastiQ blends including polymers heretofore considered non-biodegradable, such as polyethylene, a substantial portion or even substantially all of the carbon atoms in the blended product can be far more quickly converted by microorganisms into $CO_2$ and/or $CH_4$. Additionally, when blending with polymers heretofore considered to be industrially compostable (PLA) or perhaps even biodegradable, such as PBAT, the rate and/or extent of biodegradation may be further increased by addition of the NuPlastiQ material. For example, while PLA may be compostable under some "industrial" compost conditions, upon blending with NuPlastiQ, the PLA may become compostable under less aggressive "home" compost conditions (e.g., at lower temperature). Similar enhancements may occur with PBAT, PHA, or the like. The rate of conversion depends on several factors such as thickness of the part, number of microorganisms, type of microorganisms, ratio of NuPlastiQ and other polymer in the product, type of plastics in the blend, the strength of the carbon bonds in the plastic, etc. It is believed that the particle size of the starch-based material in the blend, as well as distribution characteristics thereof, may also affect biodegradability.

While blends of early grades of Applicant's starch-based polymeric material (e.g., formerly known as "ESR") and polyolefins have been shown to be biodegradable, and to provide enhanced strength characteristics, by ensuring that the starch-based material is present so as to have a very small average particle size, with tight distribution characteristics, the consistency and quality of such performance characteristics can be improved. For example, such control over particle sizes can ensure that desired high strength characteristics are consistently achieved, from batch to batch, etc.

III. Exemplary Articles and Methods

The present blends and processes can include one or more conventional plastic (e.g., polymeric) materials (e.g., including, but not limited to polyethylene, polypropylene, other polyolefins, polystyrene, ABS, polyvinyl chloride, nylon, or polycarbonate). Numerous other plastic materials, including those considered to be partially or wholly biodegradable or compostable (such as PBAT, PHA and/or PLA, each of which exhibit at least some such characteristics) are also contemplated for use in blending with Applicant's NuPlastiQ material. The blend of course also includes one or more carbohydrate-based polymeric materials, such as NuPlastiQ itself. The carbohydrate-based polymeric materials and the conventional other plastic materials can be provided in a desired form, such as pellets, powders, curdles, slurry, and/or liquids. In specific embodiments, the materials can be in the form of pellets. The present methods further include blending the other plastic material with the carbohydrate-based polymeric material.

Such blends may be formed in manufacture into a desired article through any conceivable process. An example of such would be an extrusion process. For example, the conventional plastic material and the carbohydrate-based polymeric material can be fed into an extruder (e.g., into one or more hoppers thereof). The different materials can be fed into the extruder into the same chamber, into different chambers, at approximately the same time (e.g., through the same hopper), or at different times (e.g., through different hoppers, one being introduced into the extruder earlier along the screw than the other), etc. It will be apparent that many blending possibilities are possible.

A key characteristic of the present blends is that the selected carbohydrate-based polymeric material be capable of forming very small particle sizes, as it becomes dispersed in the other polymeric material. Recently available carbohydrate-based polymeric materials from BiologiQ, under the tradename NuPlastiQ (e.g., NuPlastiQ GP and NuPlastiQ CG) differ from earlier similar materials, even those available from Applicant, and are capable of consistently providing the small particle sizes and substantially homogenous distribution characteristics when blended into various other polymeric materials, as described herein. The finely tuned physical characteristics, including hydrophobicity matching that of conventional polyolefin materials, allows such NuPlastiQ materials to be compounded into such other plastic materials so as to have very small particle sizes, significantly smaller than is exhibited by other commercially available starch-polyolefin blends.

Applicant has found that controlling the conditions at which the starch and other ingredients (such as the plasticizer) are maintained during the preparation of NuPlastiQ contribute to the desired formation of a starch-based polymeric material with the desired small particle size and tight distribution in the final blend of the starch-based polymeric material once blended with the other polymer. Thus, the materials during reactive extrusion formation of the starch-based polymeric material are maintained at a temperature of 110° C. to 160° C. and preferably 120° C. to 140° C. (e.g., about 130° C.) in the final stage of the extruder, prior to its mixing with the other polymer such as the polyolefin, etc. It will be apparent that this careful control of temperature in the last stage of the reactive extrusion step when forming the starch-based polymeric material is different from control of temperature in an extruder when blending such already formed starch-based polymeric material with the other polymer with which it is being blended. Although such temperatures may be similar, the components present in such stages are entirely different (e.g., in the stage described here, no "other polymer", such as the polyolefin, or compatibilizer, is typically present).

In some cases, the conventional "other" plastic material to be blended with can include a polyolefin. For example, such plastic materials may include, but are not limited to polyethylene, polypropylene, other polyolefins, polyester, polystyrene, ABS, polyvinyl chloride, nylon, polycarbonates, and the like. Such plastic material may be sourced from petrochemical sources, or from so-called "green" or renewable sources (e.g., "green" PE, bioPET, and the like). Various polyesters, which may exhibit some degree of compostability and/or biodegradability (e.g., PBAT, PLA, PHA, etc.), or other materials, may also be used for blending with the NuPlastiQ.

The carbohydrate-based polymeric materials, such as NuPlastiQ available from Applicant, can be formed from a plurality of materials (e.g., a mixture) including one or more starches. For example, the one or more starches can be produced from one or more plants, such as corn starch, tapioca starch, cassava starch, wheat starch, potato starch, rice starch, sorghum starch, and the like. In some embodiments, a mixture of different types of starches may be used, which Applicant has found to result in a synergistic increase in strength. A plasticizer may also be present within the mixture of components from which the carbohydrate-based polymeric materials are formed. Water may also be used in forming the carbohydrate-based polymeric material, although only a small to negligible amount of water is present in the finished carbohydrate-based polymeric material.

The one or more carbohydrate-based polymeric materials can be formed from mostly starch. For example, at least 65%, at least 70%, at least 75%, or at least 80% by weight of the carbohydrate-based polymeric material may be attributable to the one or more starches. In an embodiment, from 65% to 90% by weight of the finished carbohydrate-based polymeric material may be attributed to the one or more starches. Other than negligible water content, the balance of the finished carbohydrate-based polymeric material may be or attributed to a plasticizer (e.g., glycerin). The percentages above may represent starch percentage relative to the starting materials from which the carbohydrate-based polymeric material is formed, or that fraction of the finished carbohydrate-based polymeric material that is derived from or attributable to the plasticizer (e.g., at least 65% of the carbohydrate based polymeric material may be attributed to (formed from) the starch(es) as a starting material). Although some water may be used in forming the carbohydrate-based polymeric material, substantially the balance of the carbohydrate-based polymeric material may be attributed to glycerin, or another plasticizer. Very little residual water (e.g., less than 2%, typically no more than about 1%) may be present in the finished carbohydrate-based polymeric material.

For example, the materials from which the one or more carbohydrate-based polymeric materials are formed can include at least 12%, at least 15%, at least 18%, at least 20%, at least 22%, no greater than 35%, no greater than 32%, no greater than 30%, no greater than 28%, or no greater than 25% by weight of a plasticizer. Such percentages may represent that fraction of the finished carbohydrate-based polymeric material that is derived from or attributable to the plasticizer (e.g., at least 12% of the carbohydrate based polymeric material may be attributed to (formed from) the plasticizer as a starting material).

Exemplary plasticizers include, but are not limited to glycerin, polyethylene glycol, sorbitol, polyhydric alcohol plasticizers, hydrogen bond forming organic compounds which do not have a hydroxyl group, anhydrides of sugar alcohols, animal proteins, vegetable proteins, aliphatic acids, phthalate esters, dimethyl and diethylsuccinate and related esters, glycerol triacetate, glycerol mono and diacetates, glycerol mono, di, and tripropionates, butanoates, stearates, lactic acid esters, citric acid esters, adipic acid esters, stearic acid esters, oleic acid esters, other acid esters, or combinations thereof. Glycerin may be preferred.

The finished carbohydrate-based polymeric material may include no greater than 5%, no greater than 4%, no greater than 3%, no greater than 2%, no greater than 1.5%, no greater than 1.4%, no greater than 1.3%, no greater than 1.2%, no greater than 1.1%, or no greater than 1% by weight water. The newest grades of NuPlastiQ materials available from BioLogiQ (e.g., NuPlastiQ GP and NuPlastiQ CG) are examples of such finished carbohydrate-based polymeric materials, although it will be appreciated that other materials available elsewhere (e.g., at some future time) may also be suitable for use. By way of example, the newest grades of NuPlastiQ materials are produced by methods that more tightly control temperature and other process parameters during manufacture, allowing consistent achievement of the presently described particle size and distribution characteristics.

In some embodiments, mixtures of different starches may be used in forming the carbohydrate-based polymeric material. Use of such a mixture of different starches (e.g., coming from different plants) has been found to surprisingly be associated with a synergistic increase in strength in articles including such carbohydrate-based polymeric materials. In such a mixture of starches, a starch can be present in the mixture in an amount of at least 1%, at least 2%, at least 3%, at least 4%, at least 5%, at least 10%, at least 15%, at least 20%, at least 25%, at least 30%, at least 35%, at least 40%, no greater than 95%, no greater than 90%, no greater than 85%, no greater than 80%, no greater than 75%, no greater than 70%, no greater than 65%, no greater than 60%, no greater than 55%, no greater than 50%, or from 10% to 50% by weight relative to the combined weight of the plurality of starches. Some non-limiting exemplary mixtures may include 90% of a first starch, and 10% of a second starch, or 30% of a first starch and 70% of a second starch, or 50% of a first starch and 50% of a second starch. Mixtures of more than two starches (e.g., using 3 or 4 different starches) can also be used. Such increased strength resulting from use of mixtures of starches is described in Applicant's U.S. Pat. No. 10,214,634, and U.S. application Ser. No. 16/287,884 filed Feb. 27, 2019, each of which is herein incorporated by reference in its entirety.

Examples of suitable carbohydrate-based (e.g., starch-based) polymeric materials for use in forming films and other articles are available from BioLogiQ, located in Idaho Falls, Id., under the tradename NuPlastiQ. Specific examples include, but are not limited to 2019 and later grades or batches of NuPlastiQ GP and NuPlastiQ CG. Additional details relative to fractions of starch and glycerin or other plasticizers used in forming NuPlastiQ are described in Applicant's other patent applications, already incorporated herein by reference. NuPlastiQ may be provided in pellet form. Physical characteristics for two examples of NuPlastiQ materials, previously referred to as GS-270 and GS-300, are shown in Table 1 below. Although values for density, melt flow index, melting temperature, tensile strength, Young's modulus, elongation at break, dart impact, and water content are given for older grades of Applicant's materials, these particular properties are still believed representative of the new 2019 NuPlastiQ batches and grades. Additional properties that may be specific to such new grades will also be described herein.

TABLE 1

| PROPERTY | TEST METHOD | GS-270 NOMINAL VALUE | GS-300 NOMINAL VALUE |
| --- | --- | --- | --- |
| Density | ASTM D-792 | 1.40 g/cm$^3$ | 1.42 g/cm$^3$ |
| THERMAL PROPERTIES | | | |
| Melt Flow Index 200° C./5 kg | ASTM D-1238 | 1.98 g/10 min | 1.95 g/10 min |
| Melting Temp. Range | ASTM D-3418 | 166-180° C. | 166-180° C. |

TABLE 1-continued

| PROPERTY | TEST METHOD | GS-270 NOMINAL VALUE | GS-300 NOMINAL VALUE |
| --- | --- | --- | --- |
| MECHANICAL PROPERTIES | | | |
| Tensile Strength @ Yield | ASTM D-638 | >30 MPa | >14 MPa |
| Tensile Strength @ Break | ASTM D-638 | >30 MPa | >14 MPa |
| Young's Modulus | ASTM D-638 | 1.5 GPa | 1.5 GPa |
| Elongation at Break | ASTM D-638 | <10% | <10% |
| Impact Resistance (Dart) | ASTM D-5628 | 3.5 kg | 4.5 kg |
| ADDITIONAL PROPERTIES | | | |
| Water Content | ASTM D-6980 | ≤1.5%, or ≤1% | ≤1.5%, or ≤1% |

As mentioned, the above basic characteristics shown for GS-270 and GS-300 are exemplary of newer NuPlastiQ products available from BioLogiQ, although values may vary somewhat. For example, suitable NuPlastiQ products may generally have a glass transition temperature ranging from about 70° C. to about 100° C. Those of skill in the art will appreciate that glass transition temperature can be indicative of degree of crystallinity. Values for melting temperature range, density, Young's Modulus, and water content are similar to those shown above in Table 1. Some characteristics may similarly vary somewhat (e.g., ±25%, or ±10%) from values shown in Table 1. NuPlastiQ has an amorphous structure (e.g., more amorphous than typical raw starch). For example, typical raw starch powder has a mostly crystalline structure (e.g., greater than 50%), while NuPlastiQ has a mostly amorphous structure (e.g., less than 10% crystalline), as will be described in further detail in conjunction with FIG. 1 below.

While some of the properties may be similar to other thermoplastic starch materials, others may differ markedly from typical starch-based materials. For example, the density of such reactively extruded NuPlastiQ materials is particularly high, e.g., greater than 1 g/cm$^3$, at least 1.1 g/cm$^3$, at least 1.2 g/cm$^3$, or at least 1.25 g/cm$^3$, (e.g., the 1.4 g/cm$^3$, as shown above in Table 1). Various of the other properties may also differ substantially from superficially similar appearing starch-based polymeric materials. The NuPlastiQ materials have a low water content, as described. As this material absorbs moisture, it exhibits plastic behavior and becomes flexible. When removed from a humid environment, the material dries out and becomes stiff again (e.g., again exhibiting less than about 1-1.5% water content). The moisture present in NuPlastiQ (e.g., in pellet form) may be released in the form of steam during processing (e.g., extrusion, film blowing, injection molding, blow molding, etc.). As a result, films or other articles produced from a starch-based polymeric material blended with another plastic material may exhibit even lower water content, as other plastic material typically will include no or negligible water, and the water in the NuPlastiQ may typically be released during manufacture of a desired article.

Low water content in the carbohydrate-based NuPlastiQ polymeric material, as well as hydrophobic, rather than hydrophilic characteristics in the NuPlastiQ, can be important, as significant water content (or hydrophilicity) can result in incompatibility with the other plastic material (which is typically hydrophobic) with which the NuPlastiQ material is blended. Water content is particularly a problem where the article requires formation of a thin film. For example, as the water vaporizes, this can result in voids within the film or other article, as well as other problems. When blowing a thin film, the carbohydrate-based polymeric material used may preferably include no more than about 1% water. By matching hydrophobicity between the NuPlastiQ material and the other polymeric material blended therewith, this can also aid in achieving the desired very small particle sizes for the NuPlastiQ material dispersed within the other polymeric material matrix.

Low water content is not achieved in the NuPlastiQ material through esterification or etherification, as is common in some conventional TPS materials that may include relatively low water content. Such esterification or similar modifications can be expensive and complex to perform. Furthermore, the NuPlastiQ materials that are exemplary of the carbohydrate-based polymeric materials employable herein have been mechanically, physically or chemically reacted and/or altered, compared to the starting starch and glycerin materials. X-ray diffraction patterns of exemplary carbohydrate-based polymeric materials as described below (e.g., as shown in FIG. 1) evidence such chemical or physical alteration. In addition, both the starch and glycerin starting materials are hydrophilic, while the NuPlastiQ material is hydrophobic. In other words, in at least the case of NuPlastiQ, the carbohydrate-based polymeric material is not recognized as a simple mixture including native starch and glycerin. The low water content achievable in the carbohydrate-based polymeric material, as well as the exhibited hydrophobicity may be due at least in part to the physical or chemical alteration of the starch and plasticizer materials into a hydrophobic thermoplastic polymer, which does not retain substantial water as would native starch, or conventional thermoplastic starches.

Nevertheless, processing at relatively high temperatures may result in some release of volatized glycerin (e.g., visible as smoke). If needed (e.g., where stored pellets may have absorbed additional water), drying of pellets can be performed by simply introducing warm dry air, e.g., at 60° C. for 1-4 hours, which is sufficient to drive off any absorbed water. Pellets should be dried to less than about 1% moisture content prior to processing, particularly if forming a film. NuPlastiQ pellets may simply be stored in a sealed container with or without a desiccant in a dry location, away from heat to minimize water absorption, and to prevent undesired degradation.

In addition to NuPlastiQ being thermoplastic, the NuPlastiQ may also be thixotropic, meaning that the material is solid at ambient temperature, but flows as a liquid when heat, pressure and/or frictional movement are applied. Advantageously, pellets of NuPlastiQ can be used the same as petrochemical based pellets (any typical plastic resin pellets) in standard plastic production processes. NuPlastiQ materials and products made therefrom may exhibit gas barrier characteristics. Products (e.g., films) made using such pellets exhibit oxygen gas barrier characteristics (e.g., see Examples of Applicant's previous filings for earlier versions of NuPlastiQ, already incorporated by reference). NuPlastiQ may be non-toxic, made using raw materials that are all edible. NuPlastiQ and products made therefrom may be water resistant, even hydrophobic. Articles comprising the starch-based material may still have a surface wettability that is relatively low (e.g., 34 dynes/cm or less), similar to many typical polyolefins (e.g., polyethylene or polypropylene). Such hydrophobicity is in contrast to many existing starch-based materials.

In addition, the NuPlastiQ or other starch-based material may be stable, in that it may not exhibit any significant retro-gradation, even if left in relatively high humidity conditions. In contrast, most thermoplastic starches will recrystallize over time because some parameters of the thermoplastic starch structure are not sufficiently stabilized to limit the mobility of starch molecules, plasticizer migration and evaporation over time. Such recrystallization of starch molecules, is referred to as "retrogradation," which is exhibited by a deterioration of the mechanical properties of most thermoplastic starch materials, e.g., resulting in a brittle material. Of course, products made with NuPlastiQ or a similar starch-based material may also exhibit such characteristics. If NuPlastiQ is stored in humid conditions, the excess absorbed water can simply be evaporated away, and once the water content is no more than about 1%, it can be used in forming a desired article.

Similar to paper, NuPlastiQ does not typically undergo biodegradation under typical storage conditions, even in relatively humid conditions, as the other conditions typical of an anaerobic digester, industrial compost or similar disposal environment containing the particular needed microorganisms are not present. Of course, where such conditions are present, not only does NuPlastiQ biodegrade, but otherwise non-biodegradable plastic materials blended therewith (e.g., polypropylene) surprisingly have been shown to biodegrade. Extensive evidence of such is described in Applicant's other applications, already incorporated herein by reference.

Figure 8A:
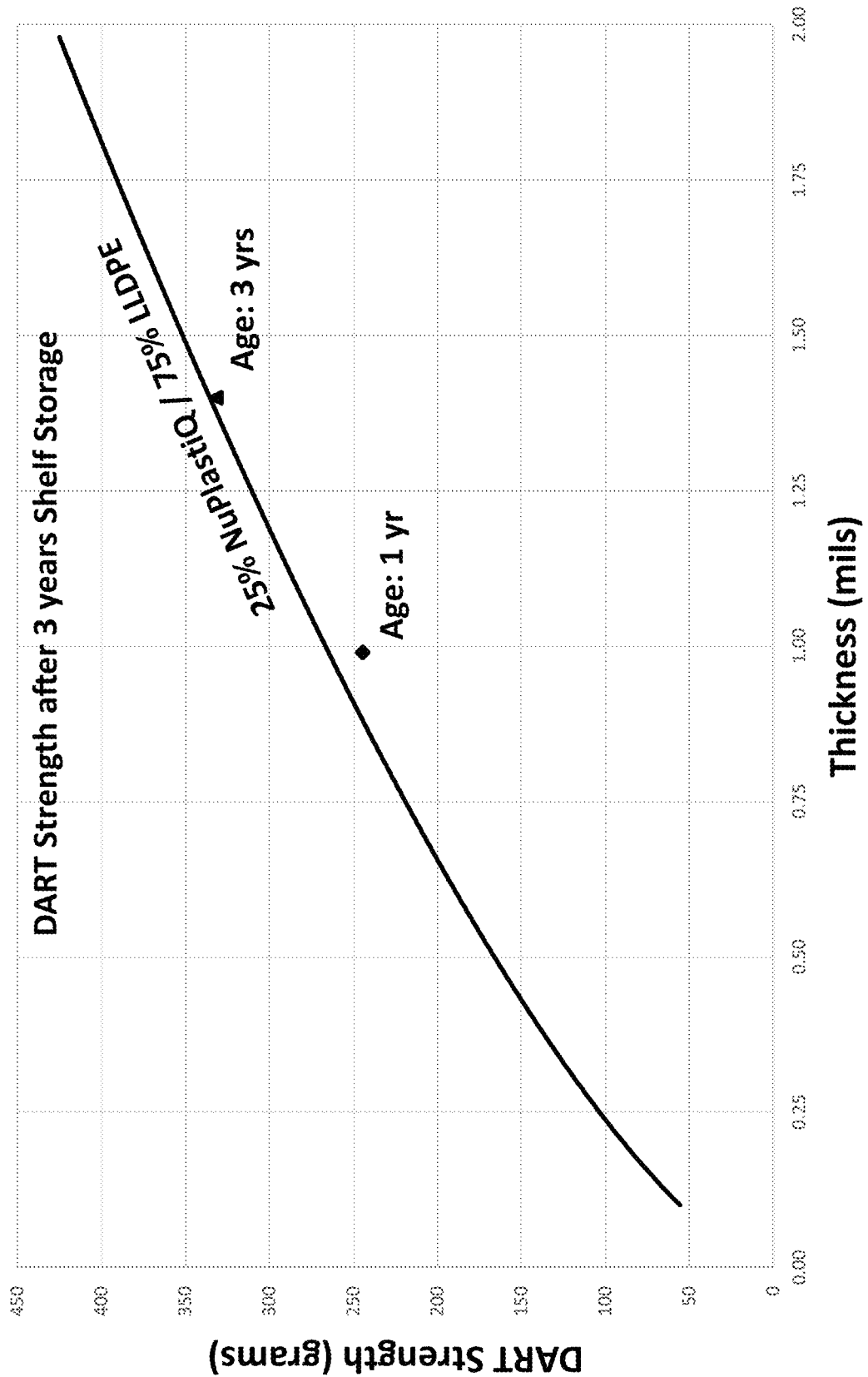
FIG. 8A charts dart drop impact strength of exemplary films made of a blend of NuPlastiQ and LLDPE, for a variety of thicknesses, also showing how strength remains substantially unchanged after up to 3 years in storage.
Figure 8B:
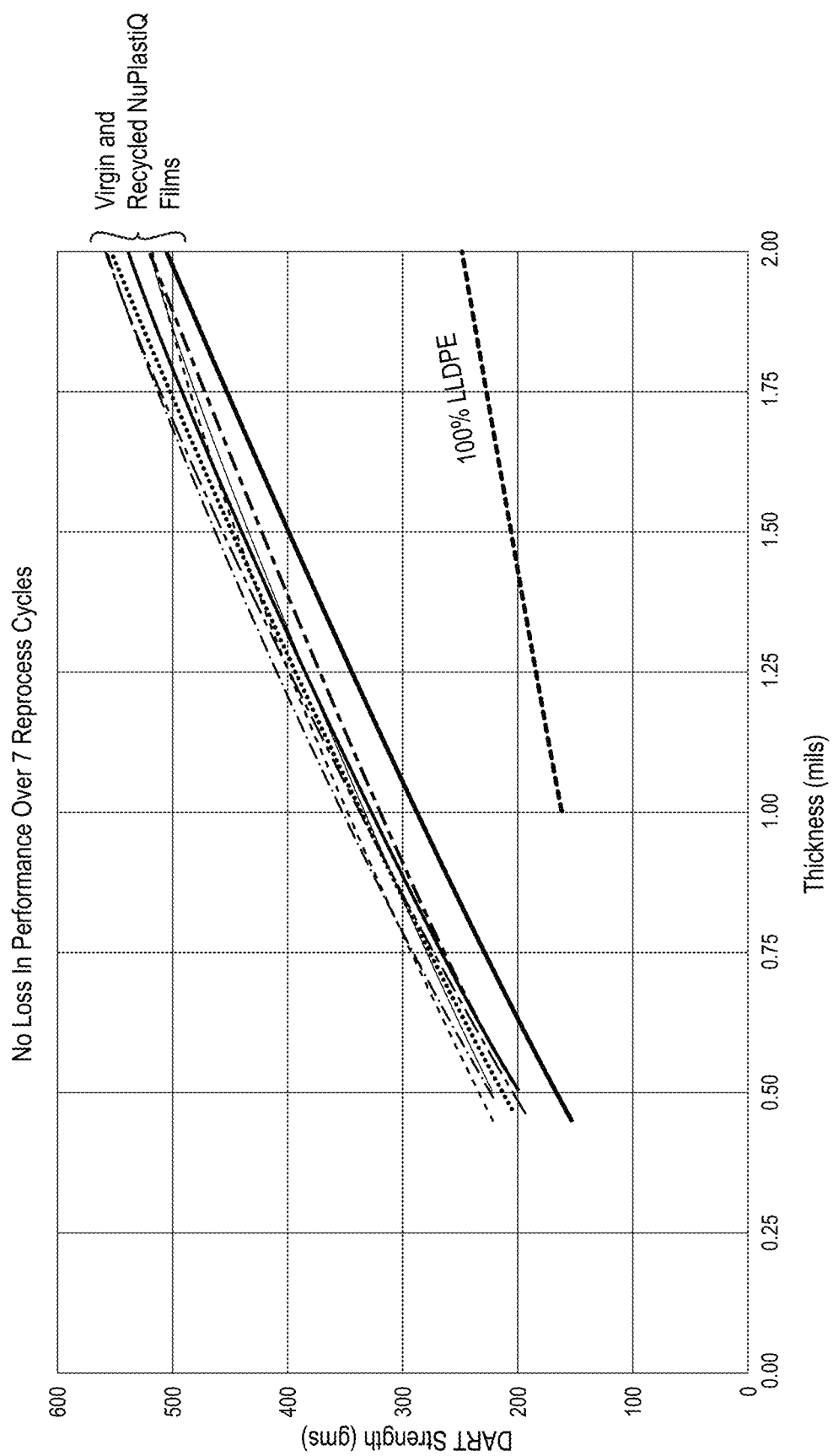
FIG. 8B charts dart drop impact strength of exemplary films made of a blend of NuPlastiQ and LLDPE, for a variety of thicknesses, as compared to films of 100% LLDPE, and also showing how strength remains substantially unchanged after up to 7 reprocessing cycles.

Stability of NuPlastiQ blends in general is shown in FIG. 8A, where dart strength remains substantially constant, even after 1-3 years of storage (e.g., the film maintains at least 90% of an initial strength after such period). FIG. 8B illustrates the repeated recyclability of such blends, showing no significant loss in dart drop strength, after 7 reprocessing (recycle) cycles.

NuPlastiQ can be cost competitive, being manufactured at a cost that is competitive with traditional polyethylene plastic resins. NuPlastiQ can be mixed with other polymers, including, but not limited to PE, PP, PET, polyesters, polystyrenes, acrylonitrile butadiene styrene (ABS), polyvinyl chloride, nylon, and others. While the above non-biodegradable polymers can be rendered biodegradable (as defined herein) by blending with NuPlastiQ, it will be appreciated that NuPlastiQ can also be blended with polymers that already exhibit significant biodegradability and/or compostability, such as polylactic acid (PLA), poly(butylene adipate-co-terephthalate) (PBAT), polybutylene succinate (PBS), polycaprolactone (PCL), polyhydroxyalkanoates (PHA), other so-called thermoplastic starches, as well as various other polyester materials, such as PBS, PCL, and PHA. EcoFLEX™ plastic, a PBAT, is another example of a plastic material with which the NuPlastiQ carbohydrate-based polymeric material may be blended.

By way of further explanation, PLA is compostable, meaning that it can degrade under elevated temperature conditions (i.e., industrial composting conditions), but may not technically be "biodegradable" under less favorable conditions (e.g., ASTM D5511). Some of the above listed materials, such as PBS, PCL, and PHA may be both biodegradable and compostable. EcoFLEX™ (PBAT) is certified as (industrially) compostable. FTC Green guidelines stipulate that a plastic cannot make an unqualified claim that it is "degradable" unless it will degrade within a "reasonably short period of time" (most recently defined as within 5 years) "after customary disposal".

In some embodiments, the NuPlastiQ could be provided in a masterbatch formulation that may include the carbohydrate-based polymeric material, one or more other plastic materials, and optionally a compatibilizer. Such a masterbatch may include an elevated concentration of the carbohydrate-based polymeric material, e.g., so as to be specifically configured for mixing with pellets of the same or another plastic material already included in the masterbatch, at the time of further processing where a given article is to be formed, effectively dropping the concentration of the carbohydrate-based polymeric material down to the desired final value (e.g., the masterbatch may be at about 50% NuPlastiQ, while the finished article may include 20-30% NuPlastiQ). Of course, lower or higher fractions may be used. Any conceivable ratios may be used in mixing such different pellets, depending on the desired percentage of NuPlastiQ and/or compatibilizer and/or conventional plastic material in the finished article.

NuPlastiQ includes very low water content. For example, although raw starch (e.g., used in forming NuPlastiQ) may typically include about 13% bound water by weight, the finished NuPlastiQ pellets available from BioLogiQ include less than about 1% water (including bound water). NuPlastiQ materials are biodegradable, and as described herein, not only is the starch-based NuPlastiQ material biodegradable, but when blended with other polymers, such as non-biodegradable PE, PP, PET, polyester, polystyrene, ABS, polyvinyl chloride, nylon, and other non-biodegradable plastic materials, the blended material which includes NuPlastiQ becomes substantially entirely biodegradable. "Substantially entirely biodegradable" may refer to at least 80%, at least 85%, or at least 90% biodegradability, or to a biodegradability that equals or exceeds the biodegradability of a cellulose positive control typically used in such respirometry testing (e.g., under ASTM D-5338 or ASTM D-5511). Such results are quite surprising, and particularly advantageous. Typical thermoplastic starch materials do not impart such characteristics when blended with other plastic materials. Of course, NuPlastiQ can also be used in forming blends with materials that are compostable and/or biodegradable on their own (e.g., PLA, PBAT, PHA, etc.) which may exhibit increased biodegradability, i.e., the rate and/or extent of biodegradation.

The NuPlastiQ materials described as suitable for use herein as the carbohydrate-based (e.g., starch-based) polymeric material are substantially amorphous. For example, raw starch powder (e.g., such as is used in making NuPlastiQ and various other thermoplastic starch materials) has approximately a 50% crystalline structure. NuPlastiQ materials available from BioLogiQ differ from many other commercially available thermoplastic starch (TPS) materials in crystallinity versus amorphous characteristics. For example, p. 62-63 of "Thermoplastic Starch Composites and Blends" a PhD thesis by Kris Frost (September 2010) states "[o]f particular interest in TPS is completeness of gelatinisation during processing, and any subsequent tendency toward retrogradation to form V-type amylose crystals". Frost further continues "[g]elatinisation involves loss of granular and crystalline structures by heating with water and often including other plasticizers or modifying polymers. Retrogradation is due to the re-coiling of amylose helical coils. Starch molecules disrupted during gelatinisation slowly re-coil into their native helical arrangements or new single helical conformations known as V type, causing TPS films to rapidly become brittle and lose optical clarity". Thus, conventional TPS tends to re-form a crystalline structure after the gelatinization process used to produce the TPS from raw starch. On the contrary, the NuPlastiQ material available from BioLogiQ does not revert back to a mostly crystalline structure as it remains substantially amorphous indefinitely. In addition, it can maintain a stable, relatively high degree of optical clarity, so as to be useful in forming relatively optically clear films (e.g., particularly by sandwiching NuPlastiQ containing layers between polyethylene or other polyolefin layers).

In contrast to typical TPS materials, the NuPlastiQ materials that are suitable examples of starch-based polymeric materials for use in forming articles described in the present application have an amorphous microstructure, and physical characteristics. The difference in the molecular structure between conventional TPS and NuPlastiQ materials is evidenced by the NuPlastiQ materials as described herein being much less crystalline than conventional thermoplastic starch-based materials as shown by X-ray diffraction, shown in FIG. 1 comparing diffraction pattern results for NuPlastiQ GP as compared to native raw corn starch and native raw potato starch from which the NuPlastiQ GP of FIG. 1 is formed. The diffraction pattern of the NuPlastiQ as seen in FIG. 1 is much less crystalline (e.g., crystallinity of about 7%) than that of the native corn and potato starches (crystallinity of about 42% and 31%, respectively). The difference in diffraction pattern evidences that a substantial chemical change has occurred in the material, due to conversion from the native starches into NuPlastiQ (e.g., through a reactive extrusion process). For example, while there are several prominent diffraction peaks between about 15-25° with the native starch, the diffraction is quite different with the NuPlastiQ material, which shows a far less intense, "bell curve shaped" peak centered at about 20°. Interestingly, the NuPlastiQ shows a small peak at about 10°, while the starch materials actually show a trough at 10°, although the small peak at 10° for the NuPlastiQ is still at a lower intensity than the troughs of the native starch materials. Across the entire spectrum, the diffraction intensities are higher for the native starches than for the NuPlastiQ. The elevated diffraction intensity seen across a wide spectrum is indicative of greater crystallinity of the native starches as compared to the NuPlastiQ. Numerous differences exist, as shown.

By way of example, the carbohydrate-based (e.g., starch-based) polymeric material used in making films according to the present disclosure may have a crystallinity of less than about 40%, less than about 35%, less than about 30%, less than about 25%, less than about 20%, less than about 15%, less than about 10%, less than about 9%, less than about 8%, less than 7%, less than about 6%, less than about 5%, or less than about 3%. Any suitable test mechanism for determining crystallinity may be used, e.g., including but not limited to FTIR analysis, X-ray diffraction methods, and symmetrical reflection and transmission techniques. Various suitable test methods will be apparent to those of skill in the art.

In addition to the differences in the microstructure of the finished NuPlastiQ as compared to the starting materials, films, bottles, sheets, disposable utensils, plates, cups, or other articles produced from a blend including the carbohydrate-based polymeric material and NuPlastiQ as described herein are different from articles that are otherwise similar, but formed using conventional TPS and starch powder, or non-biodegradable plastic materials alone. For example, articles formed by blending the carbohydrate-based polymeric materials such as NuPlastiQ as described herein with a conventional plastic material do not have large "sea-island" particle size features that are common when blending conventional TPS materials with polymeric materials such as polyethylene. In particular, the present carbohydrate-based polymeric materials facilitate the formation of very small particle sizes of the carbohydrate-based polymeric material dispersed in the matrix of the other polymeric material. For example, average particle volumes of less than 10 $\mu m^3$, or less than 5 $\mu m^3$, average particle diameter of less than 2 $\mu m$, or less than 1 $\mu m$, and/or an average particle density of at least $1 \times 10^9$ particles/$mm^3$. Such particles may be substantially spherical in shape, rather than the significantly irregular shapes seen in conventional blends.

As described in previous applications of Applicant, the physical properties of the present films also differ significantly from conventional blends.

As described herein, blending of the carbohydrate-based polymeric materials with a plastic material currently understood to be non-biodegradable results in not just the carbohydrate-based material being rapidly biodegradable, but the non-biodegradable plastic material actually becomes significantly more rapidly biodegradable (even where the other plastic material alone is not significantly otherwise biodegradable). Such results do not occur when blending with typical TPS materials. Such differences in biodegradability rate clearly illustrate that there are significant structural and/or chemical differences in the resulting films and other articles, as the entire composite structure (i.e., the film or other structure) is now capable of being more rapidly biodegraded. The ability of the new NuPlastiQ materials to achieve consistently small particle sizes, with a very high density distribution of particles/$mm^3$ within the matrix of the other polymeric material, resulting in a very homogenous blend of the two materials, is also believed to provide enhancements to physical properties, such as strength characteristics, as well as the above described biodegradability characteristics. For example, because of the very small particle sizes, and their homogenous distribution throughout the matrix, overall biodegradability may be further enhanced (e.g., more closely approaching 100% biodegradation of the composite material as a whole).

Without being bound to any particular theory, it is believed that the carbohydrate-based polymeric resin, NuPlastiQ, may reduce the crystallinity of the blended products, interrupting the crystallinity and/or hygoscopic barrier characteristics of the polyethylene as well as other non-biodegradable plastic materials in a way that allows water and bacteria to degrade the arrangements and linkages of otherwise non-biodegradable plastic molecules of the blend, along with the intimately dispersed carbohydrate-based polymeric resin material. In other words, the long polymer chains of polyethylene or other non-biodegradable plastic material are more easily broken by chemical and mechanical forces that exist in environments that are rich in bacteria and microorganisms, when homogenously blended with the presently contemplated carbohydrate-based polymeric materials. Subsequently, the microorganisms that exist naturally in a disposal environment (e.g., in a landfill) can consume the remaining smaller molecules so that they are converted back into natural components (such as $CO_2$, $CH_4$, and $H_2O$). That said, the NuPlastiQ does not seem to promote fragmentation of the macro film or other structure into small pieces, but the films tend to biodegrade, while appearing to remain substantially intact (they progressively decrease in thickness). It is believed that this degradation effect is further enhanced, and more consistently achieved, when the carbohydrate-based polymeric component is intimately and homogenously dispersed, with the very small particle sizes as described herein.

For example, truly biodegradable plastics decompose into natural base elements or compounds such as carbon dioxide, methane, water, inorganic compounds, or biomass via microbial assimilation (e.g., the enzymatic action of microorganisms on the plastic molecules). Biodegradation of plastics can be enabled by first breaking down the polymer chains via either chemical or mechanical action but may only be fully accomplished through decomposition of the molecules by microbial assimilation.

Plastics made from petrochemical feedstocks or derived from plant sources begin life as monomers (e.g., single small molecules that can react chemically with other small molecules). When monomers are joined together, they become polymers ("many parts"), and may be known as plastics. Before being joined together, many monomers are readily biodegradable, although after being linked together through polymerization, the molecules become so large and joined in such arrangements and linkages that microbial assimilation by microorganisms is not practical within any reasonable time frame in most instances. However, the NuPlastiQ compositions used in the present invention impart increased biodegradability, particularly when consistently small particle sizes are achieved in the blend of components.

Polymers are formed with both crystalline (regularly packed) structures and amorphous (randomly arranged) structures. Many polymers contain a high degree of crystallinity with some amorphous regions randomly arranged and entangled throughout the polymeric structure.

NuPlastiQ materials available from BioLogiQ are formed starting from starch materials which are highly crystalline, but in which the finished NuPlastiQ plastic resin material exhibits low crystallinity (substantially amorphous). Such starch-based polymer materials are used as a starting material in the production of articles as described herein where NuPlastiQ is blended with conventional polymers. NuPlastiQ is, plastic that is made from starch. Because of its natural, starch-based origin and carefully controlled linkage types, the molecules (size and links) of plastic made with NuPlastiQ are highly susceptible to biodegradation by enzymatic reactions caused from the introduction of humidity (water) and bacteria or other microorganisms. The intimate dispersion of very small particle sizes of the NuPlastiQ as described herein into a matrix of conventional polymers such as polyethylene and any of various others further enhances this biodegradation (e.g., overall contact area is increased dramatically, for such small particle sizes, as compared to particle sizes having average diameters that would be 2-10 times larger), as well as NuPlastiQ's ability to impart, or otherwise enhance (e.g., extent or rate) biodegradability of the matrix material into which it is blended.

Polyolefins such as rigid forms of polyethylene and polypropylene have a high degree of crystallinity and are made by converting monomer molecules (whether petroleum derived or derived from ethanol or other small building block molecules derived from plant sources) into long chain polymers. The bonds created when connecting the monomers to form long polymer chains are strong and difficult to break. Films and other articles formed from such polymeric materials are not biodegradable as defined herein, and have significant strength. Even if a given article were formed from a blend of conventional non-biodegradable plastic material and conventional thermoplastic starch "TPS", it would not normally acquire significant biodegradability characteristics (other than the starch portion of the blend which may sometimes biodegrade), and the strength of such a blend is actually reduced as a result of inclusion of the TPS material.

In addition to biodegradability, the resulting blend may often have a higher elastic modulus (stiffness, or strength) than polyethylene or other plastic material included in the blend, so as to be useful for making plastic films or other articles that are stronger than the same articles made with pure polyethylene or other pure conventional plastic material. Such increased strength characteristics are described in U.S. patent application Ser. Nos. 14/853,725 and 15/481,806, already incorporated herein by reference. The increase in strength may similarly be more consistently achieved (e.g., from batch to batch, or with less directional variation, etc.) where the NuPlastiQ material is intimately dispersed throughout the matrix at very small particle size, as disclosed herein. For example, while conventional blends include relatively large particles ("islands" in a sea of the other polymer matrix), such conventional blends also exhibit typically reduced strength, as a result of inclusion of the conventional TPS material. By ensuring that the particle size is very small (e.g., less than 2 µm, or less than 1 µm in diameter or other comparable length/width measurement for non-spherical shapes), and inclusion of the carbohydrate-based polymeric material uniformly spread throughout the material, the present benefits are believed to be provided. In addition, the NuPlastiQ material itself typically has a relatively high Young's modulus and/or tensile strength value, so as to serve as a strengthening agent, rather than a weakening agent, within the blend. For example, often the NuPlastiQ material will have Young's modulus (e.g., about 1.5-2 GPa) and/or tensile strength values that are higher than the conventional polymer with which it is being blended. Density of the NuPlastiQ material is also significantly higher than typical TPS materials (e.g., greater than 1 $g/cm^3$, greater than 1.1 $g/cm^3$, greater than 1.25 $g/cm^3$). While perhaps not completely understood, it is believed that consistent achievement of the small particle size (e.g., from batch to batch) as described herein, is at least partially responsible for achievement of increased strength within the contemplated blends.

The increase in strength (e.g., dart drop, in a film formed from the blend) may be achieved over a wide loading range of the carbohydrate-based polymeric material in the blend, e.g., so that at very low loading values, there is no decrease in strength compared to the pure "other" polymeric material (e.g., polyethylene), and that an increase in strength occurs over a wide range, e.g., from about 5% loading, up to 35%, or even 40% loading of the carbohydrate-based polymeric material in the blend. Essentially all known TPS materials tend to weaken the blend they are added two. A very few (perhaps only U.S. Pat. No. 8,841,362 to Favis) may show a slight increase at a single point, when added at a relatively low amount, but Applicant is not aware of any materials other than Applicant's that provide increased strength over a broad range, e.g., as shown in FIGS. 22-23 of Ser. No. 15/481,806 (21132.1), herein incorporated by reference in its entirety. The ability to add the renewable carbohydrate-based polymeric material in relatively high loadings, e.g., 20-35%, without negatively affecting strength, is a significant advantage of the present invention. Increased particle surface area (through particle size reduction) may increase surface energy, providing greater tensile strength, dart impact, or other increased strength characteristics. Such increases may be more significant, and/or achieved over a wider starch loading range than the nominal increase seen only at very low starch loading as in Favis (which does not include a tight particle size distribution). For example, increases in any given strength parameter may be at least 20%, at least 25%, at least 30%, at least 35%, at least 40%, at least 45%, at least 50%, at least 55%, at least 60%, at least 65%, at least 70%, or at least 75%. Such increases may be observed at starch content loadings of not only low loading values of less than 15%, but also at loading values of at least 15%, at least 20%, at least 25%, at least 30%, and even at least 35% starch or starch-bases material. Such represents a distinct advantage over the state of the art.

While blending NuPlastiQ with another polymer in many cases results in increased strength, it will be appreciated that NuPlastiQ can also be blended with various specific polymers, which may already exhibit significantly high strength characteristics, where the blending may not result in an increase in strength, or may even decrease the strength of the blend, by comparison. Such embodiments are still within the scope of the present disclosure and invention, e.g., where the dispersion and small particle size characteristics as described herein are provided, and other benefits (e.g., increased renewable content, biodegradability, or the like), while still providing sufficient strength for a given purpose, may be achieved.

When preparing the blend, mixing of the one or more other plastic materials and the one or more carbohydrate-based materials can be performed using one or more mixing devices. In a particular implementation, a mechanical mixing device can be used to mix the one or more other plastic materials and the one or more carbohydrate-based polymeric materials. In an implementation, at least a portion of the components of the mixture of the materials can be combined in an apparatus, such as an extruder, an injection molding machine, or the like. In other implementations, at least a portion of the components of the mixture of the materials can be combined before being fed into the apparatus.

The one or more carbohydrate-based polymeric materials can be present in the mixture of materials in any desired fraction. By way of example, the carbohydrate-based polymeric material may be included in an amount of at least 0.5%, at least 1%, at least 2%, at least 3%, at least 4%, at least 5%, at least 10%, at least 15%, at least 20%, at least 25%, at least 30%, at least 35%, at least 40%, at least 45%, no greater than 99%, no greater than 95%, no greater than 90%, no greater than 80%, no greater than 70%, no greater than 60%, no greater than 50%, from 2% to 98%, from 20% to 40%, from 10% to 40%, from 20% to 30%, from 50% to 80%, or from 40% to 60% by weight of the mixture of materials. More than one carbohydrate-based polymeric material, and/or more than one other plastic material may be included in the blend, if desired. In an embodiment, at least some threshold amount of the carbohydrate-based polymeric material having very small particle size characteristics is included, although it is possible that the article may include another carbohydrate-based polymeric material that may include larger particle sizes (e.g., greater than 2 μm). Such additional material may be a different carbohydrate-based polymeric material, or even possibly the same material, just having larger particle size characteristics. That said, in an embodiment, larger particle size carbohydrate-based polymeric materials may be absent.

The other plastic material can be present in the mixture of materials in an amount of at least 0.5%, at least 1%, at least 2%, at least 3%, at least 4%, at least 5%, at least 10%, at least 15%, at least 20%, at least 25%, at least 30%, at least 35%, at least 40%, at least 45%, at least 50%, no greater than 99%, no greater than 95%, no greater than 90%, no greater than 85%, no greater than 80%, no greater than 75%, no greater than 70%, no greater than 65%, or no greater than 60%, from 2% to 98%, from 50% to 90%, from 65% to 75%, from 20% to 50%, or from 40% to 60% by weight of the mixture of materials. More than one other plastic material (i.e., combinations of such "other" plastics, e.g., polyolefin or the like) may be included in the blend.

A compatibilizer may optionally be present in the mixture of materials. The compatibilizer can be mixed with the other plastic material, the carbohydrate-based polymeric material, mixed with both, or provided separately. Often the compatibilizer may be provided with at least one of the polymeric materials, e.g., included in a masterbatch formulation. The compatibilizer can be a modified polyolefin or other modified plastic, such as a maleic anhydride grafted polypropylene, a maleic anhydride grafted polyethylene, a maleic anhydride grafted polybutene, or a combination thereof. The compatibilizer can also include an acrylate based co-polymer. For example, the compatibilizer can include an ethylene methyl acrylate co-polymer, an ethylene butyl-acrylate co-polymer, or an ethylene ethyl acrylate co-polymer. Additionally, the compatibilizer can include a poly(vinylacetate) based compatibilizer. In an embodiment, the compatibilizer may be a grafted version of the non-biodegradable plastic material (e.g., maleic anhydride grafted polyethylene where the non-biodegradable plastic material is polyethylene) or a copolymer (e.g., a block copolymer) where one of the blocks is of the same monomer as the other plastic material (e.g., a styrene copolymer where the non-biodegradable plastic material is polystyrene or ABS). Selection of a particular compatibilizer often depends on the identity of the "other" plastic material included in the blend, and the compatibilizer (if even present) can be selected to provide good compatibility results between the carbohydrate-based polymeric material and whatever particular "other" plastic material is being used.

If present, the mixture of materials may include at least 0.5%, at least 1%, at least 2%, at least 3%, at least 4%, at least 5%, no greater than 50%, no greater than 45%, no greater than 40%, no greater than 35%, no greater than 30%, no greater than 25%, no greater than 20%, no greater than 15%, no greater than 10%, no greater than 9%, no greater than 8%, no greater than 7%, no greater than 6%, from 0.5% by weight to 12%, from 2% to 7%, or from 4% to 6% by weight of a compatibilizer. In some embodiments, no such compatibilizer will be needed, particularly given the ability of the carbohydrate-based polymeric material to become dispersed at very small particle sizes, with substantially homogenous distribution, within the other plastic material. In some embodiments, the compatibilizer selection may enhance such dispersion and small particle size.

Increases in the amount of compatibilizer may affect the particle size that can be achieved with the starch-based polymeric material. For example, increasing the amount of compatibilizer may allow for achieving smaller particle sizes (e.g., even less than 0.1 μm, such as from 0.01 μm to less than 0.1 μm), and finer distribution of such particles. Such "nano" size particles may provide a significant or even extreme change in properties, as the particle size approaches the molecular size of the starch or other carbohydrate component. Selection or manipulation of molecular weight may be useful in achieving such "nano" size characteristics, where particle size may be less than 50, less than 40, less than 30, less than 20, or less than 10 times the size of a given molecule of the carbohydrate-based polymeric material (e.g., which may typically have a molecular size of up to about, e.g., 20 nm). In an embodiment, cellulose nano-fibers may be included.

As the particle size decreases to the very small dimensions described herein, such materials may be suitable for use in applications where starch materials have previously been unsuitable, such as use in coating of paper cups, or the capsule materials used in sustained release fertilizers. Such paper cups are routinely incinerated in many countries (e.g., Japan), and the use of a starch-based polymeric material of very small particle size would be an improvement over many currently employed fossil fuel resin materials used for such coatings. The use of such a material in fertilizer encapsulation (for sustained release of the fertilizer) would be advantageous, where such capsule materials often are eventually leaked to oceans and other bodies of water. The sustainable sourcing of the present materials, and potentially even their biodegradability in such an environment, for use in such fields, would be advantageous over fossil fuel resin materials currently used for such encapsulation. Further examples of possible fields of use where the very small particle size may be particularly beneficial include, but are not limited to adhesive resin materials, and sealants of laminate films, where incorporation of starch into such materials may have proved problematic previously, because particle sizes were too great.

For example, finer particle sizes (e.g., less than 150 nm (0.15 μm), or less than 100 nm, (0.1 μm)) may result in increased transparency of a film formed from blends as described herein. In addition, such smaller particle sizes may better disturb the lamellar formation of the resin (e.g., plastic) included in the present blends, which disturbance may further enhance (speed and extent) of biodegradability of the polyolefin or other plastic resin with which the blend is made. Further, increased particle surface area (through particle size reduction) may increase surface energy, providing greater tensile strength, dart impact, or other increased strength characteristics.

One or more additional "active" additives (e.g., UV and/or OXO additives) as known to be useful in the plastics' industry can be included in the mixture of materials in an amount of at least 0.5%, at least 1%, at least 1.5%, at least 2%, at least 2.5%, at least 3%, at least 4%, of no greater than 10%, no greater than 9%, no greater than 8%, no greater than 7%, no greater than 6%, no greater than 5%, from 0.2% to 12%, from 1% to 10%, from 0.5% to 4%, or from 2% by weight to 6% by weight of the mixture. Additional details of such UV and/or OXO additives is found in Applicants U.S. application Ser. No. 16/391,909 (21132.14.1), herein incorporated by reference in its entirety.

Filler additives (e.g., inorganics, such as calcium carbonate, talc or the like) can also be included in the mixture of materials. The starch or starch-based materials included in the present invention are not simply fillers, as they are believed to achieve strong intermolecular bonding with the base resin material of the blend. While such fillers may possibly be included in any amount (e.g., from 0% up to 90%), typically, any such filler may be present (if at all) within a range of up to 30%, or up to 20% by weight of the mixture of materials. Such fillers may reduce the amount of more expensive components needed in the composition. The particle size of such fillers on average may be smaller, similar, or larger than the average particle size of the starch or starch-based component in the blend.

While principally described in the context of a mixture of thermoplastic materials that can be melted together, to form a desired blend, in some embodiments, it may be possible to blend the carbohydrate-based polymeric material with a plastic material that is not thermoplastic (e.g., that is thermoset, e.g., such as for silicone). For example, the resin components that are precursors of such non-thermoplastic plastic materials may be blended with the carbohydrate-based polymeric material, where polymerization or other formation of the non-thermoplastic material may occur in the presence of the carbohydrate-based polymeric material, resulting in a finished article that is a blend of the carbohydrate-based polymeric material and a thermoset or other non-thermoplastic plastic material, where the carbohydrate-based polymeric material exhibits small particle size and excellent dispersion characteristics as described herein. Blending of NuPlastiQ with such thermoset materials may result in imparted biodegradability for non-biodegradable thermoplastics, and/or enhancement (extent and/or rate) for biodegradable thermoplastics.

By way of example, particularly where the materials are thermoplastic, a manufacturing process for forming an article may include heating the mixture of materials. In an implementation, the mixture of materials can be heated to a temperature of at least 100° C., at least 110° C., at least 115° C., at least 120° C., at least 125° C., at least 130° C., at least 135° C., at least 140° C., no greater than 250° C., no greater than 190° C., no greater than 180° C., no greater than 175° C., no greater than 170° C., no greater than 165° C., no greater than 160° C., no greater than 155° C., no greater than 150° C., from 95° C. to 250° C., from 120° C. to 180° C., or from 125° C. to 165° C. Heating of such materials may be within a multi-stage extruder, which heats the mixture of materials to a given temperature in each extruder stage, where progressive stages are heated to higher temperature than the preceding stage, e.g., as disclosed in various of Applicant's patent applications, already incorporated by reference. In an embodiment, the temperature of the first stage of such extruder for the blend may be in the same range as the temperature of the carbohydrate-based polymeric material (e.g., NuPlastiQ) in the final stage of the reactive extrusion process in which it was manufactured (e.g., 120-140° C.), as described above.

The mixture of materials including the ordinarily plastic material and the carbohydrate-based polymeric material can be heated in one or more chambers of an extruder. In some cases, one or more chambers of the extruder can be heated at different temperatures. The speed of one or more screws of the extruder can be any desired rate.

An article is produced using the mixture of materials. In some cases, the article can include a film. In other cases, the article can be formed from a film. In other embodiments, the article can have a shape based on a design, such as a mold (e.g., injection molded). Any conceivable article formed of plastic may be formed from the mixture, e.g., including but not limited to films, bags, bottles, caps, lids, sheets, boxes, plates, cups, utensils, and the like. Where the article is a film, the film can be formed using a die by injecting a gas into the heated mixture of material to form the film (i.e., blowing the film). Films can be sealed and/or otherwise modified to be in the form of a bag or other article.

Where the article is a film, the film can be comprised of a single layer or multiple layers. The film or any individual layers can have a thickness of at least 0.001 mm, at least 0.002 mm, at least 0.004 mm, at least 0.01 mm, at least 0.02 mm, at least 0.03 mm, at least 0.05 mm, at least 0.07 mm, at least 0.10 mm, no greater than 2 mm, no greater than 1 mm, no greater than 0.5 mm, no greater than 0.1 mm, from about 0.05 mm to about 0.5 mm, or from 0.02 mm to 0.05 mm. While there may be some overlap in thickness values for film and sheet articles, it will be appreciated that sheet materials of greater thickness than such film values may of course be provided, produced by any desired plastic manufacturing process.

Films or other articles can have strength characteristics that are characterized through testing, such as a dart drop impact test (ASTM D-1709), tensile strength at break test (ASTM D-882), tensile elongation at break test (ASTM D-882), a secant modulus test (ASTM D-882), and/or an Elmendorf Tear test (ASTM D-1922). Films can have a dart drop impact test value of at least 150 g, at least 175 g, at least 200 g, at least 225 g, at least 250 g, at least 275 g, at least 300 g, no greater than 400 g, no greater than 375 g, no greater than 350 g, or no greater than 325 g, from 140 g to 425 g, from 200 g to 400 g, from 250 g to 350 g, from 265 g to 330 g. In an implementation, such values may be for whatever the thickness of the film is. In another implementation, such values may be for a 1 mil thickness film formed from the mixture of materials.

The article can have a tensile strength at break test value in the machine direction of at least 3.5 kpsi, at least 3.7 kpsi, at least 3.9 kpsi, at least 4.1 kpsi, at least 4.3 kpsi, or at least 4.5 kpsi, no greater than 5.5 kpsi, no greater than 5.3 kpsi, no greater than 5.1 kpsi, no greater than 4.9 kpsi, or no greater than 4.7 kpsi, from 3.5 kpsi to 5.5 kpsi, or from 4.1 kpsi to 4.9 kpsi.

The article can have a tensile strength at break test value in the transverse direction of at least 3.2 kpsi, at least 3.4 kpsi, at least 3.6 kpsi, at least 3.8 kpsi, at least 4.0 kpsi, at least 4.2 kpsi, no greater than 5.7 kpsi, no greater than 5.5 kpsi, no greater than 5.3 kpsi, no greater than 5.1 kpsi, no greater than 4.9 kpsi, no greater than 4.7 kpsi, no greater than 4.5 kpsi, from 3.2 kpsi to 5.7 kpsi, or from 3.6 kpsi to 5.0 kpsi.

In an embodiment, the tensile strength (e.g., at break) in the machine direction may be similar to that in the transverse direction. In other words, the materials may exhibit strength that is substantially the same, independent of test direction. For example, in some films or other articles, high strength may be achieved in one direction, but in a trade-off for very low strength in the other direction. Such characteristics are not desireable in many applications (e.g., bags, agricultural films, etc.) where loads may be applied in either or both directions. The present articles may provide a ratio of strength (e.g., tensile strength) in one direction relative to another direction (e.g., MD/TD) that is from 0.75 to 1.25, from 0.8 to 1.2, or from 0.9 to 1.1. In other words, the strength value may be within 25%, within 20%, or within 10% of the value in the other direction. Such characteristics are particularly valuable in bags and other fields where loads may be applied in either or both directions. Such characteristics may also correlate to the relatively high dart drop impact values described herein, as dart drop accounts for strength in both directions, as well.

The article can have a tensile elongation at break test value in the machine direction of at least 550%, at least 560%, at least 570%, at least 580%, at least 590%, at least 600%, at least 610%, at least 620%, no greater than 725%, no greater than 710%, no greater than 700%, no greater than 680%, no greater than 665%, no greater than 650%, no greater than 635%, from 550% to 750%, or from 600% to 660%.

The article can have a tensile elongation at break test value in the transverse direction of at least 575%, at least 590%, at least 600%, at least 615%, at least 630%, or at least 645%, no greater than 770%, no greater than 755%, no greater than 740%, no greater than 725%, no greater than 710%, no greater than 695%, no greater than 680%, from 575% to 775%, or from 625% to 700%. The present articles may provide a ratio of elongation strength (e.g., tensile elongation at break) in one direction relative to another direction (e.g., MD/TD) that is from 0.75 to 1.25, from 0.8 to 1.2, or from 0.9 to 1.1. In other words, the tensile elongation value may be within 25%, within 20%, or within 10% of the value in the other direction.

Where applicable the article can have an Elmendorf tear force test value in the machine direction of at least 280 g/mil, at least 300 g/mil, at least 320 g/mil, at least 340 g/mil, or at least 360 g/mil, no greater than 450 g/mil, no greater than 430 g/mil, no greater than 410 g/mil, no greater than 390 g/mil, or no greater than 370 g/mil, from 275 g/mil to 475 g/mil, or from 325 g/mil to 410 g/mil.

Where applicable the article can have an Elmendorf tear force test value in the transverse direction of at least 475 g/mil, at least 490 g/mil, at least 500 g/mil, at least 525 g/mil, at least 540 g/mil, or at least 550 g/mil, no greater than 700 g/mil, no greater than 680 g/mil, no greater than 650 g/mil, no greater than 625 g/mil, no greater than 600 g/mil, no greater than 580 g/mil, or no greater than 570 g/mil, from 475 g/mil to 725 g/mil, or from 490 g/mil to 640 g/mil.

Where applicable the article can have a secant modulus of elasticity test value in the machine direction of at least 20 kpsi, at least 22 kpsi, at least 24 kpsi, at least 26 kpsi, at least 28 kpsi, or at least 30 kpsi, no greater than 40 kpsi, no greater than 38 kpsi, no greater than 36 kpsi, no greater than 34 kpsi, or no greater than 32 kpsi, from 20 kpsi to 40 kpsi, or from 25 kpsi to 35 kpsi.

Where applicable the article can have a secant modulus of elasticity test value in the transverse direction of at least 20 kpsi, at least 22 kpsi, at least 24 kpsi, at least 26 kpsi, at least 28 kpsi, or at least 30 kpsi, no greater than 40 kpsi, no greater than 38 kpsi, no greater than 36 kpsi, no greater than 34 kpsi, or no greater than 32 kpsi, from 20 kpsi to 40 kpsi, or from 25 kpsi to 35 kpsi.

In some cases, articles including a carbohydrate-based polymeric material formed from a mixture of two or more starches have values of strength properties that are greater than articles including a carbohydrate-based polymeric material formed from a single starch. For example, an article including a carbohydrate-based polymeric material formed from a mixture of two or more starches can have a dart drop impact test value (in grams or g/mil of thickness) that is at least about 10% greater than an article where the carbohydrate-based polymeric material is formed from a single starch, at least about 25% greater, at least about 50% greater, at least about 75% greater, from 10% greater to 150% greater or from 60% greater to 120% greater than the same article but including a carbohydrate-based polymeric material formed from a single starch. Details of such increased strength is found within U.S. Pat. No. 10,214,634 and U.S. application Ser. No. 15/481,806, each incorporated by reference in its entirety herein.

When subjected to biodegradation testing (e.g., whether biomethane potential testing, or any applicable ASTM standard, such as ASTM D-5511, ASTM D-5526, ASTM D-5338, or ASTM D-6691, the articles of this invention, including NuPlastiQ may exhibit significant biodegradation. Under such testing, and within a given time period (e.g., 30 days, 60 days, 90 days, 180 days, 365 days (1 year), 2 years, 3 years, 4 years, or 5 years, the articles may show substantial biodegradation of the total polymeric content, and/or the other plastic content (apart from the carbohydrate-based polymeric content). Biomethane potential testing is typically conducted over 30 or 60 days, although sometimes for as long as 90 days. The longer time period tests are more typically performed under any of the above mentioned ASTM standards. The conditions of the biomethane potential tests may be based on the ASTM standards (e.g., ASTM D-5511 or D-5338), but adapted to provided accelerated results. Articles made from the compositions of this invention may show biodegradation that is greater than the carbohydrate-based polymeric material content thereof, indicating that the other plastic material(s) are also biodegrading (or exhibit the potential to biodegrade under a biomethane potential test).

Particularly when subjecting the articles to testing simulating biodegradation under landfill or other degradation conditions (e.g., composting conditions, or marine conditions) for 180 days, 200 days, 365 days (1 year), 2 years, 3 years, or 5 years, the biodegradation can be greater than the weight percent of carbohydrate-based polymeric materials (NuPlastiQ) within the article. In other words, inclusion of the described carbohydrate-based polymeric materials can result in at least some biodegradation of the other plastic material (which materials alone may not significantly biodegrade).

For example, an article such as a film that is formed from a blend of the carbohydrate-based polymeric materials, and PE may exhibit biodegradation after such periods of time that is at least 20% more than the weight fraction of the carbohydrate-based polymeric materials in the film, indicating that significant fractions of the PE (normally not thought to be biodegradable) is actually being biodegraded, with the carbohydrate-based polymeric material. Such results are surprising, and particularly advantageous. The time frame for such a result may be any of those already mentioned herein (e.g., within 180 days, 1 year, etc.). Such results are described in detail in various of the applications already incorporated by reference.

Biomethane potential testing determines the potential for anaerobic biodegradation based methanogenesis as a percent of total methanogenesis potential. Biomethane potential testing can be used to predict biodegradability of the tested samples according to the ASTM D-5511 standard and the biomethane potential testing can be conducted using one or more conditions from the ASTM D-5511 standard. For example, the biomethane potential testing can take place at a temperature of about 52° C. Additionally, the biomethane potential testing can have some conditions that are different from those of ASTM D-5511, e.g., to accelerate the test so as to be completed within the typical 30, 60, or sometimes as long as 90 days. Biomethane potential testing can employ an inoculum having from 50% to 60% by weight water and from 40% to 50% by weight organic solids. For example, an inoculum used in biomethane potential testing can have 55% by weight water and 45% by weight organic solids. Biomethane potential testing can also take place at other temperatures, such as from 35° C. to 55° C. or from 40° C. to 50° C.

When subjected to biodegradation testing, an article made from the compositions of this invention having an amount of carbohydrate-based polymeric material and the other plastic material as described herein can exhibit excellent biodegradation. For example, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or even at least 95% of the non-carbohydrate-based polymeric material (e.g., the "other" plastic material) may biodegrade over a period of at least about 1 year, at least about 2 years, at least about 3 years, or at least about 5 years when subjected to anaerobic digester conditions, aerobic digester conditions, industrial composting conditions, home composting conditions and/or marine conditions (or conditions simulating such). The various ASTM tests noted herein provide such conditions, as will be appreciated by those of skill in the art. Such biodegradation is particularly remarkable and advantageous. Thus not only does the carbohydrate-based polymeric material biodegrade, but the other plastic material may biodegrade as well.

With increased time, the amount of biodegradation can be very high, such that in at least some implementations, substantially the entire article biodegrades (e.g., biodegradation of at least about 85%, at least about 90%, or at least about 95% within 180 days, or 200 days, or 365 days (1 year), within 2 years, within 3 years, within 5 years, or other period).

The molecular weight of the small particle starch or starch-based material may be any desired value. By way of example, suitable carbohydrate-based polymeric materials may have molecular weight values greater than 100,000 g/mol, greater than 500,000 g/mol, greater than 750,000 g/mol, greater than 1 million g/mol, such as greater than 2 million, greater than 3 million, greater than 4 million, greater than 5 million, greater than 6 million, greater than 7 million, or greater than 8 million, e.g., up to 50 million, up to 40 million, up to 30 million, up to 25 million, or up to 20 million, such as from 10 to 16 million (e.g., see Applicant's Application No. 63/033,676 (21132.31) filed Jun. 2, 2020, herein incorporated by reference. Of course, lower molecular weight values may also be suitable for use (e.g., 1 million or less). Determination of molecular weight may be by any suitable technique, e.g., including but not limited to techniques based on absolute or relative GPC techniques. By way of example, the values obtained in Applicant's Application No. 63/033,676 (21132.31) were obtained through absolute GPC size exclusion chromatography (SEC) techniques that will be apparent to those skilled in the art. Such tested NuPlastiQ materials exhibited polydispersity values (Mw/Mn) of from 1.4 to 2.0. For example, suitable materials may more generally exhibit polydispersity values of from 1 to 5, 1 to 3, or 1.25 to 2.5.

Figure 2:
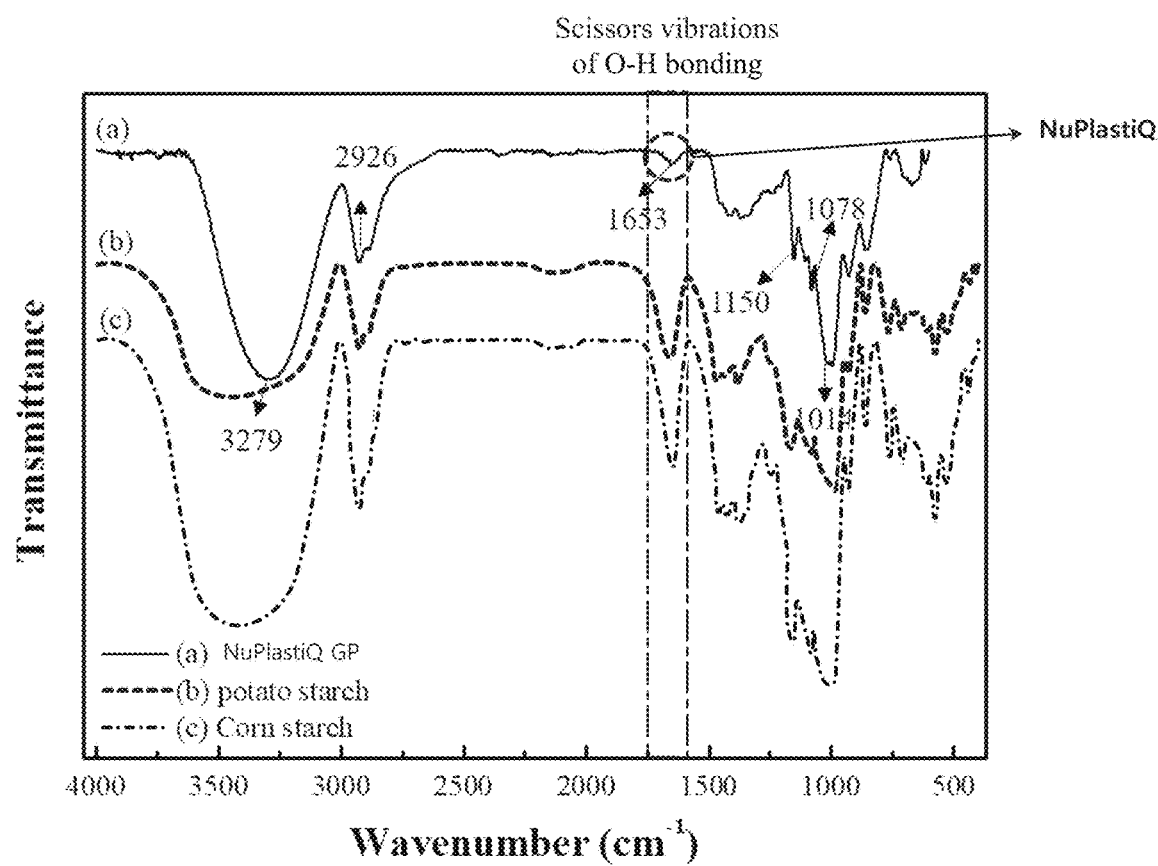
FIG. 2 shows FT-IR spectrum data for NuPlastiQ GP, as well as for native corn starch and native potato starch. While the starches are hydrophilic, the NuPlastiQ GP is hydrophobic. While NuPlastiQ is an example of a material that may be used having very small particle sizes, it will be appreciated that other thermoplastic starches, or other starch materials generally, may also be suitable for use as described herein, so long as they have the described small particle sizes.

FIG. 2 shows transmittance data for the same materials compared in the X-ray diffraction chart of FIG. 1. It is readily apparent that the O—H scissors vibrations peak at 1653 cm$^1$ of the NuPlastiQ material is significantly reduced, by comparison to the native corn and potato starch materials. This decreased incidence of such OH groups is consistent with the low wettability shown in FIG. 5, described in further detail below.

Figure 3:
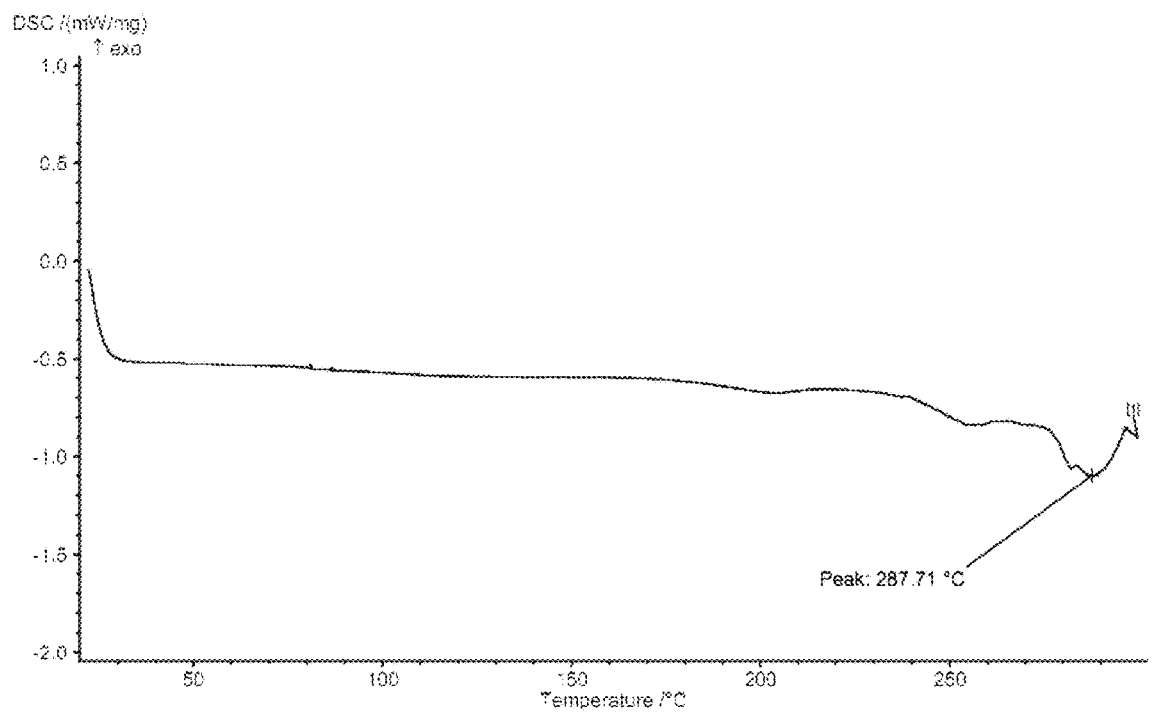
FIG. 3 shows comparative DSC melting temperature profile data for a conventional starch material.

FIG. 3 illustrates comparative DSC melting temperature data on a conventional starch material, which shows a melting temperature of 287.7° C., which is far higher than the melting temperature of about 170° C. for NuPlastiQ.

Figure 4:
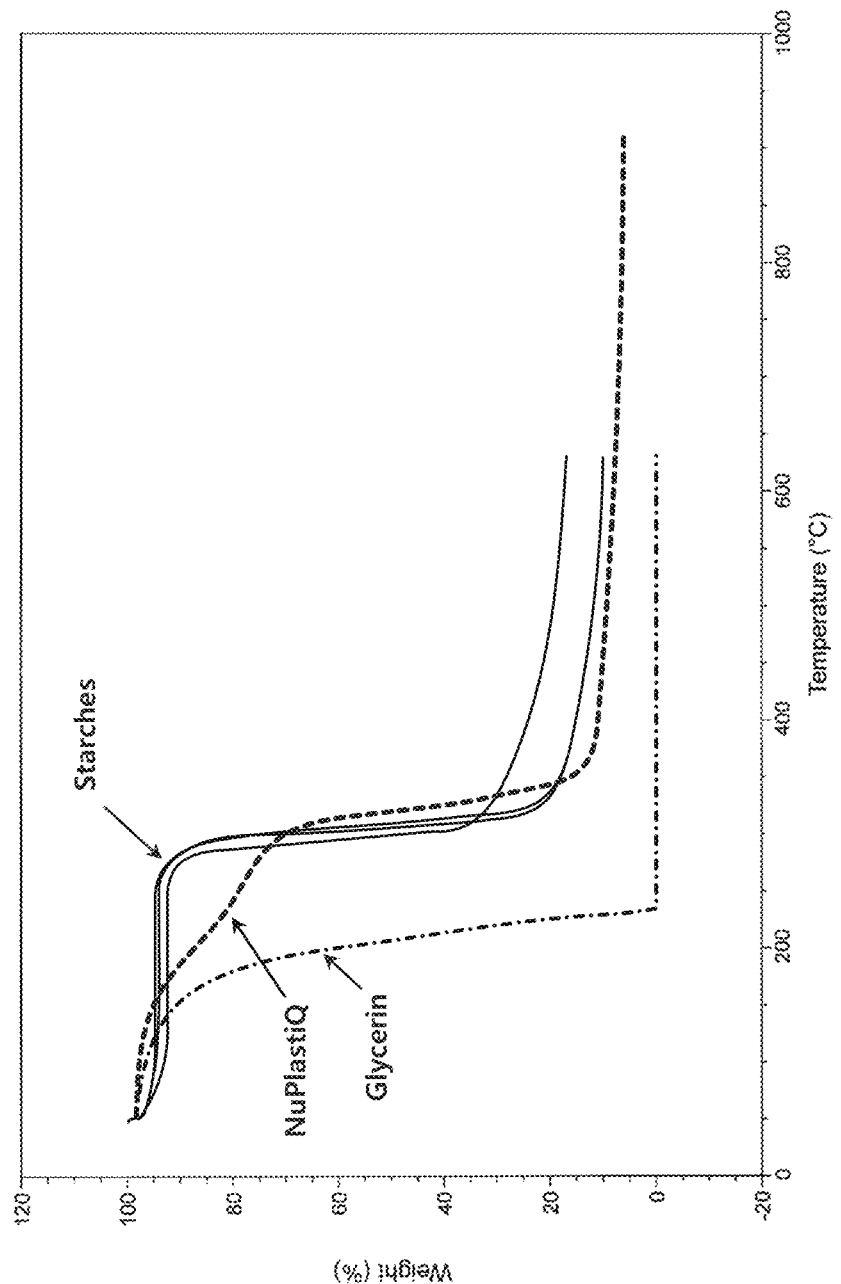
FIG. 4 shows TGA temperature stability data for an exemplary NuPlastiQ material, as compared to glycerin and starches.

FIG. 4 shows TGA temperature stability characteristics for the NuPlastiQ GP material, as compared to the starting glycerin and native starch materials.

FIG. 5 shows a comparison of the wettability characteristics of a conventional blend of a polyolefin with a conventional TPS material (left), which has a wettability of greater than 46 dyne/cm, as compared to an exemplary blend of a polyolefin with NuPlastiQ GP (right), which has a wettability of less than 34 dyne/cm. The NuPlastiQ blend is significantly more hydrophobic, like the polyolefin material. For example, typical polyethylene and polypropylene materials often have a surface wettability rating of about 29-32 dyne/cm, which is hydrophobic. The NuPlastiQ material is similarly hydrophobic, e.g., having a wettability value when used in such a dyne test of less than 40 dyne/cm, less than 38 dyne/cm, less than 36 dyne/cm, or less than 34 dyne/cm. Such surface wettability dyne tests may be according to DIN 53394/ISO 8296, for example. The matched hydrophobicity between the NuPlastiQ material and the other polymeric material with which it is blended may also play a part in the ability to achieve the very good distribution and very small particle size (e.g., less than 2 μm, or less than 1 μm particle sizes) described herein.

FIGS. 6A-6D show exemplary potato, corn, tapioca, and NuPlastiQ GP particles, contrasting the significant difference in size, as well as uniformity in size and shape of the NuPlastiQ particles, as compared to the native starches. FIG. 6A shows potato starch particles, having sizes from 5 to 50 μm, where the particles vary widely in size, and shape ranges from generally spherical to oval shaped. FIG. 6B shows corn starch particles, having sizes from 5 to 20 μm, where the particles also vary relatively widely in size, and shape is quite angular along the edges, so that the particles are generally polygonal, rather than substantially spherical. FIG. 6C shows tapioca starch particles, which share many similarities to the corn starch particles, where sizes also range from 5 to 20 μm, and the shape is also polygonal, with angular edges.

FIG. 6D shows NuPlastiQ GP particles, which appear significantly different from the particles of FIGS. 6A-6C, particularly given the difference in scale (by a factor of over 30) between the two. The NuPlastiQ particles are significantly smaller in size, and are substantially uniform in shape. In particular, the NuPlastiQ particles exhibit an average size (e.g., diameter) of about 0.3 μm (300 nm), and are uniformly substantially spherical in shape, although they may be ever so slightly oblong, having an aspect ratio (length to width for the shape that is substantially spherical) of 0.7 to 1.3, or 0.8 to 1.2 (e.g., within 30%, or 20% of perfectly spherical).

In addition, from FIG. 6D it is apparent that the particles of NuPlastiQ GP show very little variation in size from one particle to the next, so as to exhibit a very tight distribution of sizes about the mean particle size. FIG. 7 charts an exemplary particle size distribution for a similar NuPlastiQ GP material, with a slightly larger average particle size (0.5 μm compared to 0.3 μm) as compared to FIG. 6D, but otherwise similar thereto. FIG. 7 shows a tight bell curve type particle size distribution around 0.4 to 0.5 μm, with about 90% or more of the particles falling between 0.3 and 0.8 μm. The standard deviation of the distribution seen in FIG. 7 is 0.14 (i.e., mean particle diameter is 0.5±0.14 μm). The mean aspect ratio is 1.2±0.15.

Thus, in an embodiment, the mean particle size is less than 2 μm, less than 1 μm, less than 0.5 μm, less than 0.2 μm, such as from 0.01 μm to 1 μm, from 0.05 μm to 1 μm, from 0.1 μm to 1 μm, from 0.1 μm to 0.8 μm, from 0.15 μm to 0.8 μm (e.g., 0.1 μm, 0.15 μm, 0.2 μm, 0.3 μm, 0.4 μm, 0.5 μm, 0.6 μm or the like). In addition to exhibiting small average particle size, the distribution of particle sizes may be relatively tight, specifically avoiding inclusion of particles that may be larger than 1 μm, larger than 1.2 μm, larger than 1.5 μm, or larger than 2 μm. While the Favis reference noted herein may disclose small average particle sizes, it does not include such a tight particle size distribution, but also includes large size particles, such as those sizes specifically noted above as being excluded in at least some embodiments according to the present invention. Standard deviation may thus be small (e.g., less than 0.15 μm), as noted herein. The particle sizes, and relatively uniform shape (substantially spherical), may provide for average particle volumes of less than 10 μm$^3$, less than 8 μm$^3$, less than 7 μm$^3$, less than 6 μm$^3$, less than 5 μm$^3$, less than 4 μm$^3$, less than 3 μm$^3$, less than 2 μm$^3$, less than 1 μm$^3$, less than 0.5 μm$^3$, less than 0.3 μm$^3$, less than 0.2 μm$^3$, less than 0.1 μm$^3$, less than 0.05 μm$^3$, less than 0.03 μm$^3$, such as from 0.000001 μm$^3$ to 1 μm$^3$, from 0.00001 μm$^3$ to 1 μm$^3$, from 0.0001 μm$^3$ to 1 μm$^3$, from 0.001 μm$^3$ to 1 μm$^3$, from 0.01 μm$^3$ to 1 μm$^3$, from 0.01 μm$^3$ to 0.1 μm$^3$, or the like. By way of example, the 0.5 μm diameter particles of FIG. 7 have a per particle volume of $4/3 \cdot \pi \cdot r^3$, where r is 0.25 μm$^3$ (V=0.065 μm$^3$), and the 0.3 μm particles of FIG. 6D have a per particle volume of V=0.014 μm$^3$. A particle having a diameter of 0.1 μm has a per particle volume of V=0.209 μm$^3$, while a particle having a diameter of 0.05 μm has a per particle volume of V=0.0000654 μm$^3$. It will be readily apparent that volume decreases very quickly (as a cubic function) with decreasing diameter). Thus, even small decreases in diameter have a very significant effect on volume.

Because of the extremely small particle sizes, the particle density of such particles (e.g., number of particles per given volume of the article) is significantly higher than for conventional blends. For example, the particle density may be at least $1 \times 10^8$ particles/mm$^3$, at least $1 \times 10^9$ particles/mm$^3$, at least $1.5 \times 10^9$ particles/mm$^3$, or at least $2 \times 10^9$ particles/mm$^3$, such as from $1.5 \times 10^9$ particles/mm$^3$ to $100 \times 10^9$ particles/mm$^3$. Particle density of course depends on average particle size and loading of the carbohydrate-based polymeric material in the blend. By way of exemplary calculation, for a particle size of 0.5 μm, the per particle volume is 0.065 μm$^3$, and the mass of such a particle is $0.09156 \times 10^{-12}$ g. For a blend that includes 20% by weight of the carbohydrate-based polymeric material, (e.g., and 80% of the other polymeric material), this may equate to about 0.2 g of the carbohydrate-based polymeric material per cm$^3$ of the blend as a whole (e.g., where density of the carbohydrate-based polymeric material is about 1.4 g/cm$^3$, and density of the other polymeric material is about 0.9 g/cm$^3$). This equates to about $2.184 \times 10^{12}$ particles per cm$^3$ ($2.184 \times 10^9$ particles per mm$^3$, or about 35,000 particles per mil$^3$) of the blend. For an otherwise similar 20/80 blend, but where the particles are only 0.3 μm in size (volume of 0.014 μm$^3$ per particle), this equates to about $10.11 \times 10^{12}$ particles per cm$^3$ ($10.11 \times 10^9$ particles per mm$^3$, or about 165,000 particles per mil$^3$) of the blend. Additional calculations could be performed for even smaller particle sizes (e.g., 0.1 μm or 0.05 μm). If the loading of the carbohydrate-based polymeric material were only one-tenth that of the above examples (e.g., 2%), the particle densities would be 1/10 those listed above. If the carbohydrate-based polymeric material loading were double that of such examples (e.g., 40%), the particle densities would be double those listed above. It will be appreciated that a wide range of particle density loadings are thus possible, although in any case, the particles will be extremely small in size, substantially homogenously distributed throughout the blend (e.g., a particle density of at least $1\times10^8$ particles/mm$^3$ (about 1500 particles/mil$^3$).

Stated in another way, the blend may include a particle density of at least $0.5\times10^8$ particles/mm$^3$ per percentage point of the carbohydrate-based polymeric material included in the blend. Thus, at a 10% loading, the particle density may be at least $0.5\times10^9$ particles/mm$^3$, at a 20% loading the particle density may be at least $1\times10^9$ particles/mm$^3$, etc. As shown by the calculations above, actual particle density values for such loadings may be higher (e.g., about $2\times10^9$ particles/mm$^3$ at 20% loading, about $1\times10^9$ particles/mm$^3$ at 10% loading, and about $1\times10^8$ particles/mm$^3$ at 1% loading), depending on actual average particle size and distribution.

In the case of films, the film may have a thickness that is from 5 to 300 times, or from 10 to 100 times an average particle size of the particles of the carbohydrate-based polymeric material. For example, because the particle sizes are extremely small, this may facilitate formation of very thin films (e.g., routinely less than 1 mil, such as 0.5 mil, 0.3 mil, or 0.1 mil). Larger particle sizes would interfere with the ability to form such thin films without formation of voids or other faults because of the large starch particles, or would negatively affect the strength characteristics of such films, as a result of the inclusion of large starch "inclusions" in the film material.

Figure 9A:
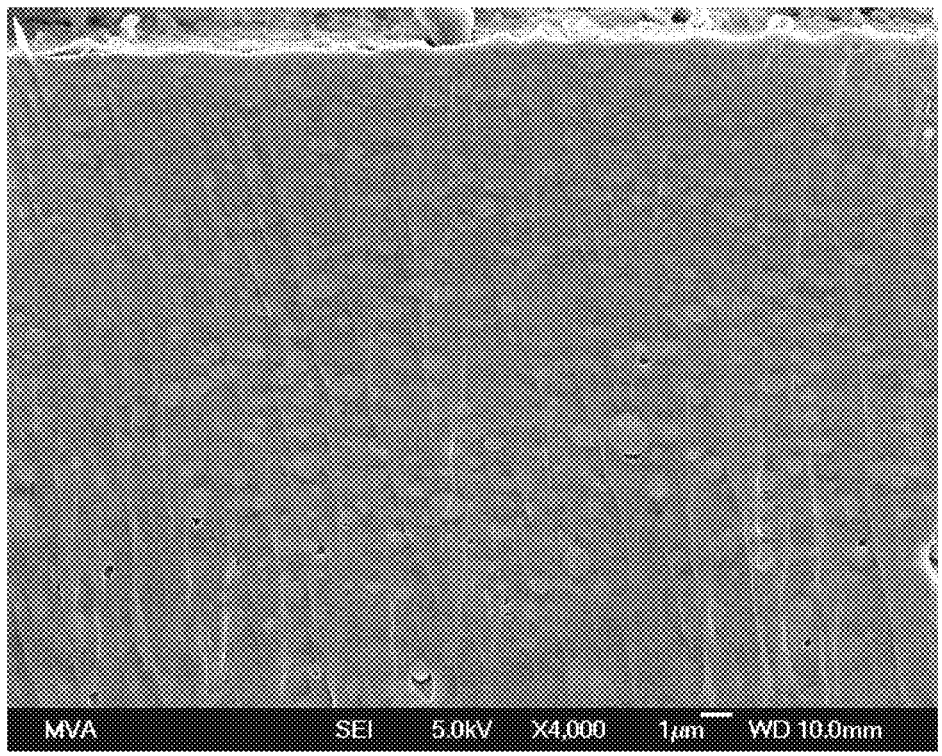
FIG. 9A is an SEM image through a cross-section of an exemplary film made of a blend of NuPlastiQ and another polymeric material, showing substantially homogenous distribution of very fine NuPlastiQ particles.
Figure 9B:
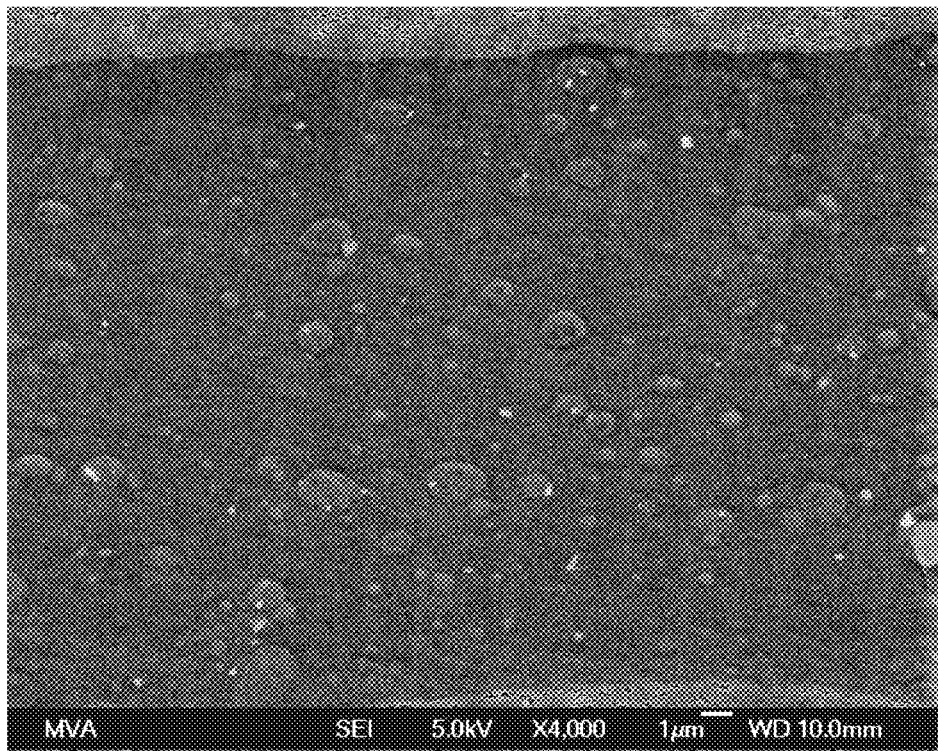
FIG. 9B is an SEM image through a cross-section of a film formed from a conventional blend of a starch-based polymeric material and another polymeric material, showing significantly larger particles and a wider distribution of particle sizes, as compared to FIG. 9A.

FIG. 9A shows an SEM image of an exemplary film formed from a blend of about 20% NuPlastiQ GP and about 80% polyethylene, with very small NuPlastiQ average particle size (e.g., less than 1 μm, such as 0.3 to 0.8 μm). 93% of the particles seen in FIG. 9A are smaller than 1 μm. The particles exhibit substantial uniformity in both size and shape. FIG. 9B shows an SEM image of a comparative film formed from a blend of a conventional blend (also about 20% TPS and about 80% polyethylene). The particles are far less uniform in shape and size. Average particle size is significantly greater than that of FIG. 9A (e.g., 64% of particles are larger than 1 μm). By way of further explanation, an average particle size of 0.5 μm provides particles that are over 200 times smaller in volume than an average particle size of 3 μm. Such equates to an enormous difference in the density of particles (e.g., number of particles per mm$^3$, as well as the surface area associated with such particles.

Features from any of the disclosed embodiments or claims may be used in combination with one another, without limitation. It will be appreciated that the scope of the present disclosure extends to rewriting any of the claims to depend from any other claim, to include multiple dependencies from any combination of other claims, and/or to combine multiple claims together. Such also extends to any individual or combinations of features of any of the embodiments as described in the Summary section, as well as the Detailed Description section. The scope of the present disclosure extends to inserting and/or removing any feature or combination of features from any claim or described embodiment, for insertion into another claim or embodiment, or drafting of a new claim including any combination of such features from any other claim(s) or embodiments.

It will also be appreciated that the present claimed invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

The invention claimed is:

1. An article comprising:
   a starch-based polymeric material formed from at least a first starch and a plasticizer; and
   another polymeric material comprising at least one of polyethylene, polypropylene, polystyrene, poly(butylene adipate-co-terephthalate) or polylactic acid;
   wherein the starch-based polymeric material is intimately dispersed within the other polymeric material and exhibits an average particle size of less than 2 μm per particle;
   wherein the starch-based polymeric material has a crystallinity of less than about 20%, and resists recrystallization, and has a water content no greater than 2% by weight.

2. The article of claim 1, wherein an average particle size of the starch-based polymeric material is less than 1 μm.

3. The article of claim 1, wherein an average particle size of the starch-based polymeric material is from 0.01 μm to 1 μm.

4. The article of claim 1, wherein an average particle size of the starch-based polymeric material is less than 100 nm.

5. The article of claim 4, wherein the starch-based polymeric material is present as generally uniformly sized regularly shaped substantially spherical particles, with a diameter from 0.01 μm to 1 μm.

6. The article of claim 1, wherein an average particle density of the particles of the starch-based polymeric material within the blend is at least about $1\times10^9$ particles/mm$^3$.

7. The article of claim 6, wherein the average particle density of the particles of the starch-based polymeric material within the blend is at least $1.5\times10^9$ particles/mm$^3$.

8. The article of claim 1, wherein the starch-based polymeric material comprises 5% to 40% by weight of the article, and the other polymeric material(s) comprises from 55% to 95% by weight of the article.

9. The article of claim 8, wherein the article further comprises a compatibilizer.

10. The article of claim 1, wherein the particles of starch-based polymeric material are substantially spherical and substantially uniform in shape.

11. The article of claim 1, wherein the article is a film, the film having a thickness of from 5 to 300 times an average particle size of particles of the starch-based polymeric material.

12. The article of claim 1, wherein the article is a film, the film having a thickness of from 10 to 100 times an average particle size of particles of the starch-based polymeric material.

13. The article of claim 1, wherein the article is a film, the film having a thickness from 0.1 to 3 mils, the film maintaining at least 90% of an initial dart strength after 1 year.

14. The article of claim 1, wherein the article is a coating on a paper cup.

15. The article of claim 1, wherein the article is a capsule material of a sustained-release fertilizer.

16. The article of claim 1, wherein the starch-based polymeric material is such that a blend of the starch-based polymeric material with the other polymeric material exhibits increased strength over a full range of about 5% to 35% by weight of the starch-based polymeric material within such blend, as compared to the other polymeric material alone.

17. The article of claim 1, wherein the starch-based polymeric material exhibits an average particle size of less than 1 µm per particle, and is substantially free of starch-based polymeric material particles having a particle size of greater than 1.5 µm.

18. The article of claim 1, wherein the starch-based polymeric material is intimately dispersed within the other polymeric material(s), exhibits an average particle size of less than 1 µm per particle, the starch-based polymeric material having an average particle size of less than 1 µm per particle being present in an amount of at least 1% by weight of the article, wherein the starch-based polymeric material is substantially free of starch-based polymeric material particles having a particle size equal to or greater than 1.5 µm.

19. The article of claim 18, wherein the starch-based polymeric material having an average particle size of less than 1 µm per particle is present in an amount of at least 2%, by weight of the article.

20. The article of claim 18, wherein the starch-based polymeric material having an average particle size of less than 1 µm per particle is present in an amount of at least 5%, by weight of the article.

21. The article of claim 18, wherein the starch-based polymeric material having an average particle size of less than 1 µm per particle is present in an amount of at least 10%, by weight of the article.

22. The article of claim 18, wherein the article further comprises additional starch-based polymeric material, which has an average particle size that is greater than 1 µm per particle.

23. The article of claim 1, wherein both the other polymeric material and the starch-based polymeric material are hydrophobic, so that the article formed from a blend of the other polymeric material and the starch-based polymeric material has a hydrophobicity of less than 40 dyne/cm.

24. The article of claim 1, wherein the particles of the starch-based polymeric material are substantially spherical, having a mean aspect ratio from 0.7 to 1.3.

25. The article of claim 1, wherein the particles of the starch-based polymeric material are substantially spherical, having a mean aspect ratio of about 1.2±0.15.

26. The article of claim 1, wherein the starch-based polymeric material is substantially free of starch-based polymeric material particles having a particle size of greater than 2 µm.

27. The article of claim 1, wherein an average particle density of the particles of the starch-based polymeric material within the blend is from $1 \times 10^8$ to $100 \times 10^9$ particles/$mm^3$.

28. The article of claim 1, wherein an average particle volume of the particles of the starch-based polymeric material within the blend is from 0.000001 $µm^3$ to 1 $µm^3$.

29. The article of claim 1, wherein an average particle volume of the particles of the starch-based polymeric material within the blend is from 0.01 $µm^3$ to 0.1 $µm^3$.

30. The article of claim 1, wherein the other polymeric material comprises poly(butylene adipate-co-terephthalate).

31. The article of claim 1, wherein the other polymeric material comprises polylactic acid.

32. The article of claim 1, wherein the other polymeric material comprises polyethylene.

33. The article of claim 1, wherein the other polymeric material comprises polypropylene.

34. The article of claim 1, wherein the other polymeric material comprises polystyrene.

35. The article of claim 1, wherein a strength of the blend is greater than a strength of the other polymeric material alone.

36. The article of claim 1, wherein the blend exhibits enhanced biodegradation in the form of enhanced rate or extent of biodegradability of the polymeric material included in the blend.

37. An article comprising:
a starch-based polymeric material formed from at least a first starch and a plasticizer, wherein the starch-based polymeric material has a crystallinity of less than about 20%, resists recrystallization, and has a water content no greater than 2% by weight; and
another polymeric material comprising at least one of polyethylene, polypropylene, polystyrene, poly(butylene adipate-co-terephthalate) or polylactic acid;
wherein the starch-based polymeric material is intimately dispersed within the other polymeric material and exhibits an average particle size of less than 2 µm per particle, and wherein the starch-based polymeric material and the other polymeric material exhibit a lack of sea-island features when blended together to form the article.

* * * * *